US011416714B2

(12) United States Patent
Smith et al.

(10) Patent No.: US 11,416,714 B2
(45) Date of Patent: Aug. 16, 2022

(54) METHOD, SYSTEM, AND APPARATUS FOR IDENTIFYING AND REVEALING SELECTED OBJECTS FROM VIDEO

(71) Applicant: Revealit Corporation, Seattle, WA (US)

(72) Inventors: Garry Anthony Smith, Seattle, WA (US); Naomi Felina Moneypenny, Brenham, TX (US); Zachary Oakes, Kochi (JP); Steven Dennis Flinn, Brenham, TX (US); Michael George Renie, Narrabeen (AU)

(73) Assignee: Revealit Corporation, Seattie, WA (US)

( * ) Notice: Subject to any disclaimer, the term of this patent is extended or adjusted under 35 U.S.C. 154(b) by 382 days.

(21) Appl. No.: 16/492,862

(22) PCT Filed: Mar. 24, 2018

(86) PCT No.: PCT/US2018/024218
§ 371 (c)(1),
(2) Date: Sep. 10, 2019

(87) PCT Pub. No.: WO2018/176017
PCT Pub. Date: Sep. 27, 2018

(65) Prior Publication Data
US 2020/0327378 A1 Oct. 15, 2020

Related U.S. Application Data

(60) Provisional application No. 62/475,942, filed on Mar. 24, 2017.

(51) Int. Cl.
*G06K 9/62* (2022.01)
*G06F 40/211* (2020.01)
(Continued)

(52) U.S. Cl.
CPC .......... *G06K 9/6263* (2013.01); *G06F 40/211* (2020.01); *G06F 40/30* (2020.01); *G06V 20/40* (2022.01)

(58) Field of Classification Search
CPC .......... G06K 9/62; G06K 9/00; G06F 40/211; G06F 40/30
See application file for complete search history.

(56) References Cited

U.S. PATENT DOCUMENTS 8,700,620 B1 4/2014 Lieberman
9,516,251 B2 12/2016 Welch
(Continued)

OTHER PUBLICATIONS

Bouayad-Agha et al., Natural Language Generation and Semantic Web Technologies, IOS Press, 2012.
(Continued)

*Primary Examiner* — Kevin Ky
(74) *Attorney, Agent, or Firm* — Robert D. Atkins; Patent Law Group: Atkins and Associates, P.C.

(57) ABSTRACT

A method, system, and apparatus for identifying and revealing objects from video identifies or infers objects from images or sequences of images upon a command, interrogative, or inferred interest of a user. The system is trained to identify or infer the objects using neural network or statistical learning-based models. The system may respond to the user in accordance with an expected user latency in requesting the system to reveal a specific object to the user. Semantic techniques may be applied to enable the system to interpret contextual or object attribute information that is provided by the users' communications to the system. The system may be applied in product promotional processes that are with respect to video that is associated with television, movies, and other video content.

21 Claims, 16 Drawing Sheets

(51) Int. Cl.
*G06F 40/30* (2020.01)
*G06V 20/40* (2022.01)

(56) References Cited

U.S. PATENT DOCUMENTS

| | | | |
|---|---|---|---|
| 10,510,018 | B2 | 12/2019 | Flinn et al. |
| 2003/0229900 | A1 | 12/2003 | Reisman |
| 2006/0195858 | A1 | 8/2006 | Takahashi et al. |
| 2008/0159622 | A1 | 7/2008 | Agnihotri et al. |
| 2009/0012842 | A1 | 1/2009 | Srinivasan et al. |
| 2009/0220011 | A1 | 9/2009 | Kursawe et al. |
| 2013/0325665 | A1 | 12/2013 | Shaffer et al. |
| 2014/0025660 | A1 | 1/2014 | Mohammed et al. |
| 2014/0129504 | A1 | 5/2014 | Soon-Shiong |
| 2015/0339573 | A1 | 11/2015 | Flinn et al. |
| 2016/0132789 | A1* | 5/2016 | Flinn ............... G06F 40/211 706/14 |
| 2017/0039627 | A1* | 2/2017 | Kalvin ............... H04N 13/204 |
| 2017/0206691 | A1* | 7/2017 | Harrises ............ G06T 11/60 |
| 2018/0203112 | A1* | 7/2018 | Mannion ............ H04R 1/406 |
| 2018/0225598 | A1 | 8/2018 | Flinn et al. |
| 2018/0276841 | A1* | 9/2018 | Krishnaswamy ...... G06V 10/82 |
| 2018/0307303 | A1 | 10/2018 | Powderly et al. |
| 2020/0372715 | A1 | 11/2020 | Sawhney et al. |

OTHER PUBLICATIONS

Cao et al., "Object Spatial Recognition for Service Robots: Where is the Front?" IEEE Int'l Conference on Mechatronics and Automation (2011) at pp. 875-880.

Gupta et al., "Observing Human-Object Interactions: Using Spatial and Functional Compatibility for Recognition," Transactions on Pattern Analysis and Mach. Intel., vol. 32 (2009).

Krizhevsky et al., "ImageNet Classification with Deep Convolutional Neural Networks" In NIPS at pp. 1106-1114 (2012).

Bouayad-Agha et al., Natural Language Generation and Semantic Web Technologies, IOS Press, Aug. 3, 2012.

Cao et al., "Object Spatial Recognition for Service Robots: Where is the Front?" IEEE Int'l Conference on Mechatronics and Automation, pp. 875-880, Aug. 7-10, 2011.

Gupta et al., "Observing Human-Object Interactions: Using Spatial and Functional Compatibility for Recognition," Transactions on Pattern Analysis and Mach. Intel., vol. 32, Oct. 2009.

Krizhevsky et al., "ImageNet Classification with Deep Convolutional Neural Networks" In NIPS at pp. 1106-1114, Dec. 2012.

* cited by examiner

METHOD, SYSTEM, AND APPARATUS FOR IDENTIFYING AND REVEALING SELECTED OBJECTS FROM VIDEO

FIELD OF THE INVENTION

The present invention relates in general to video recognition and, more particularly, to identification of objects within a video stream using artificial intelligence, and communicating object attribute information to users.

BACKGROUND OF THE INVENTION

Video images can be found in virtually every aspect of daily life. There are videos for entertainment, social media, education, business, communication, news media, and public information. Videos contain significant amounts of information in visual and audio formats. Each moment of video information passes before our attention and then it is gone to be replaced by the next moment of video information. We may recognize many objects in the video in the viewing moment, but retain relatively few long term. Other objects in the video stream may pass unrecognized because our attention was drawn elsewhere, or the amount of information is just too much to take it all in moment by moment.

Certain objects in the video stream may be more important to the viewer, or the video creator may want to emphasize certain objects in the video stream. The user may not recognize the important objects, or the objects intended to be emphasized, due to placement, distinguishing features, time on the video, or other distractions. Even if the user recognizes something of interest, the transition of the interest to real-time information content is difficult to coordinate. Whatever the object of interest may have momentarily been to the user, gathering further information on the object from the video stream has been lost.

DETAILED DESCRIPTION OF THE DRAWINGS

In the following description, numerous details are set forth to provide an understanding of the present invention. However, it will be understood by those skilled in the art that the present invention may be practiced without these details and that numerous variations or modifications from the described embodiments may be possible.

Figure 1A:
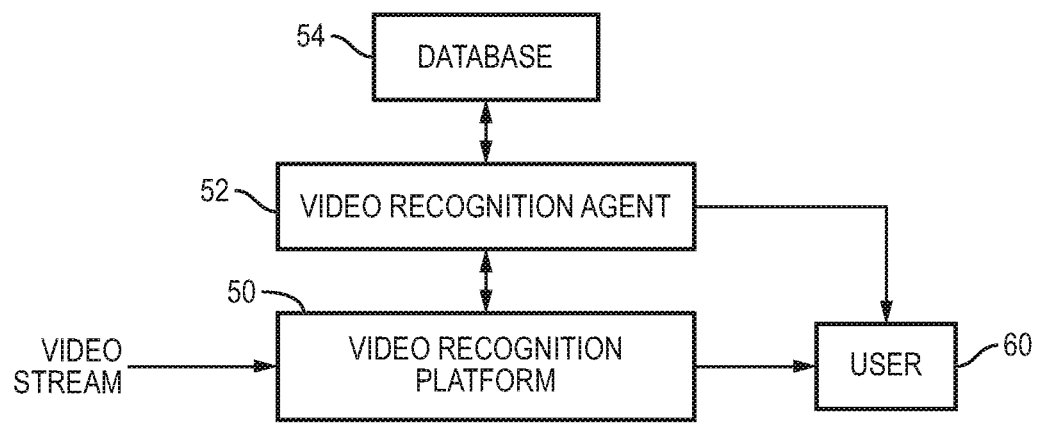
FIGS. 1a-1b illustrate a video stream processing through a video recognition platform as used by video recognition agent to provide information to a user.
Figure 1B:
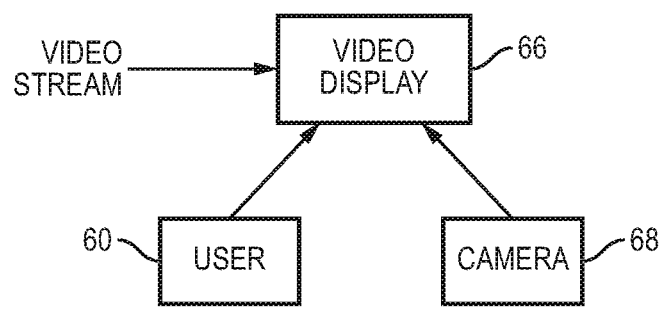

FIG. 1a illustrates a video stream incident to recognition platform 50. The video stream contains representations of objects and passes through recognition platform 50 to user 60. Video recognition agent 52 monitors recognition platform 50 to aid with identifying objects or things within the video stream. Video recognition agent 52 uses database 54 to assist with identifying objects or things within the video stream and presenting the identification of the object to user 60. FIG. 1b illustrates video display 66 displaying the video stream for user 60. User 60 is able to take pictures of the objects on display 66 using camera 68.

Figure 2:
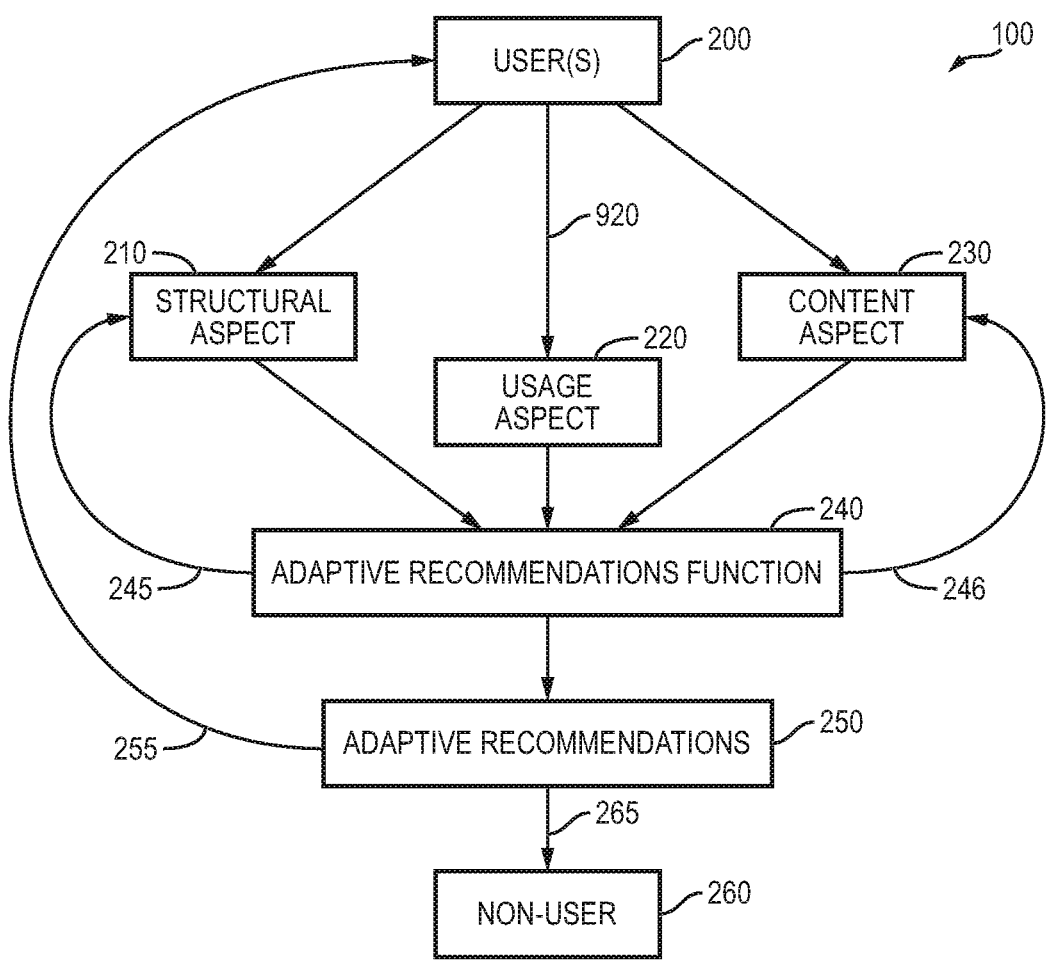
FIG. 2 illustrates an adaptive video recognition system.

The methods and systems of an adaptive system, as depicted by FIG. 2, may be applied within recognition platform 50. FIG. 2 is a generalized depiction of an adaptive system 100. Adaptive system 100 includes three aspects: a structural aspect 210, usage aspect 220, and content aspect 230. One or more users 200 interact with adaptive system 100. An adaptive recommendations function 240 may produce adaptive recommendations 250 based upon the user interactions, and the recommendations may be delivered to user 200 or applied to adaptive system 100.

Users 200 may be a single user or multiple users. As shown in FIG. 2, users 200 may receive adaptive recommendations 250. Non-users 260 of the adaptive system 100 may also receive adaptive recommendations 250 from adaptive system 100. A user 200 may be a human entity, computer system, or second adaptive system (distinct from adaptive system 100) that interacts with, or otherwise uses the adaptive system. Users 200 may therefore include non-human "users" that interact with adaptive system 100. In particular, one or more other adaptive systems may serve as virtual system "users". Other adaptive systems may operate in accordance with the architecture of adaptive system 100. Thus, multiple adaptive systems may be mutual users of one another. User 200 may also represent adaptive system 100 itself as a means of representing interactions with itself (or among its constituent elements) or as a means for referencing its own behaviors as embodied in usage aspect 220.

It should be understood that structural aspect 210, content aspect 230, usage aspect 220, and recommendations function 240 of adaptive system 100, and elements of each, may be contained within one processor-based device, or distributed among multiple processor-based devices, and wherein one or more of the processor-based devices may be portable. Furthermore, one or more non-adaptive systems may be transformed to adaptive systems 100 by means of operatively integrating usage aspect 220 and recommendations function 240 with the non-adaptive systems. Structural aspect 210 of a non-adaptive system may be transformed to fuzzy network-based structural aspect 210 to provide a greater capacity for adaptation.

The term "computer system" or the term "system," without further qualification is understood to mean either a non-adaptive or an adaptive system. Likewise, the terms "system structure" or "system content," is understood to refer to structural aspect 210 and content aspect 230, respectively, whether associated with a non-adaptive system or adaptive system 100. The term "system structural subset" or "structural subset," is understood to mean a portion or subset of the elements of structural aspect 210 of a system.

Figure 3A:
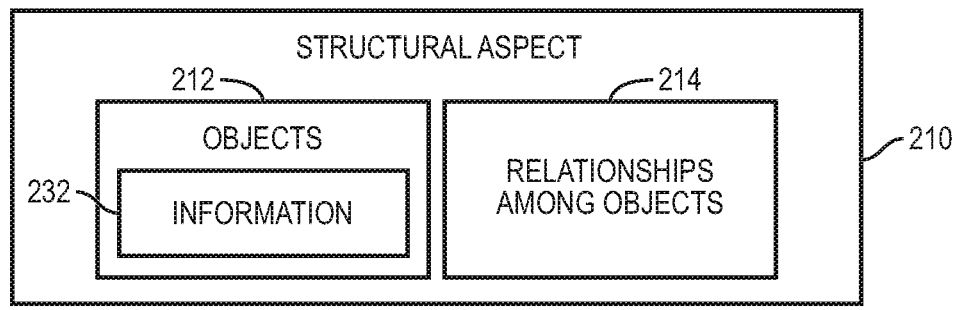
FIGS. 3a-3c illustrate the structural aspect, the content aspect, and the usage aspect of the adaptive system of FIG. 2.
Figure 3B:
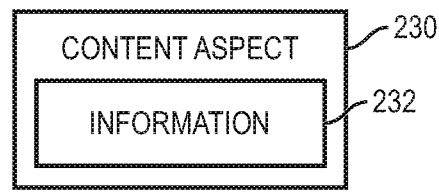

Structural aspect 210 of adaptive system 100 is depicted in the block diagram of FIG. 3a. Structural aspect 210 comprises a collection of system objects 212 that are part of adaptive system 100, as well as the relationships among objects 214, if they exist. The relationships among objects 214 may be persistent across user sessions, or may be transient in nature. Objects 212 may include or reference items of content, such as text, graphics, audio, video, interactive content, or embody any other type or item of computer-implemented information. Objects 212 may also include references, such as pointers, to content. Computer applications, executable code, or references to computer applications may also be stored as objects 212 in adaptive system 100. The content of objects 212 is known as information 232. The information 232, though part of object 214, is also considered part of content aspect 230, as depicted in FIG. 3b.

The objects 212 may be managed in a relational database 54, or may be maintained in structures such as flat files, linked lists, inverted lists, hypertext networks, or object-oriented databases. Objects 212 may include meta-information associated with information 232 contained within, or referenced by objects 212.

As an example, the World Wide Web could be considered as structural aspect 210, wherein web pages constitute the objects of the structural aspect and links between web pages constitute the relationships among the objects. Alternatively, structural aspect 210 could be composed of objects associated with an object-oriented programming language, and the relationships between the objects associated with the protocols and methods associated with interaction and communication among the objects in accordance with the object-oriented programming language.

Users 200 of adaptive system 100 may be explicitly represented as objects 212 within the system, therefore becoming directly incorporated within structural aspect 210. The relationships among objects 214 may be arranged in a hierarchical structure, a relational structure (e.g., according to a relational database structure), or according to a network structure.

Content aspect 230 of adaptive system 100 is depicted in the block diagram of FIG. 3b. Content aspect 230 comprises information 232 contained in, or referenced by objects 212 that are part of structural aspect 210. Content aspect 230 of objects 212 may include text, graphics, audio, video, including episodic programming video streams, and interactive forms of content, such as games, applets, tutorials, courses, demonstrations, modules, or sections of executable code or computer programs. Users 200 interact with content aspect 230.

Content aspect 230 may be updated based on usage aspect 220, as well as associated metrics. Adaptive system 100 may use or access information from other systems. Such systems may include other computer systems, other networks, such as the World Wide Web, multiple computers within an organization, other adaptive systems, or other adaptive recombinant systems. Content aspect 230 benefits from usage occurring in other environments.

Figure 3C:
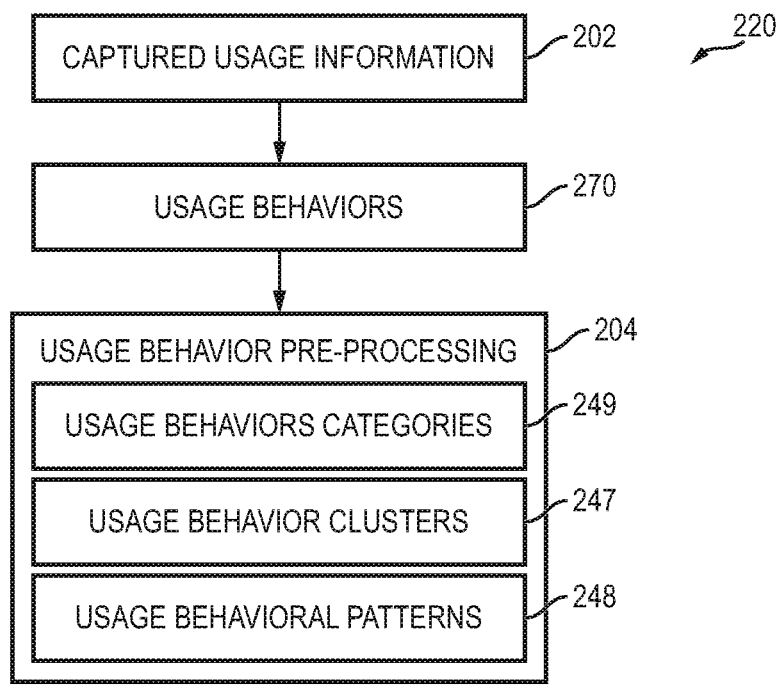

Usage aspect 220 of adaptive system 100 is depicted in the block diagram of FIG. 3c, although usage aspect 220 may also exist independently of adaptive system 100. Usage aspect 220 denotes captured usage information 202, further identified as usage behaviors 270, and usage behavior pre-processing 204. The usage aspect 220 thus reflects the tracking, storing, categorization, and clustering of the use and associated usage behaviors of users 200 interacting with, or being monitored by, adaptive system 100. Applying usage behavioral information 202, including the usage behavioral information described by Table 1, to generate relationships 214 or affinities among objects 212 may be termed "behavioral indexing."

Captured usage information 202, known also as system usage or system use 202, may include any user behavior exhibited by users 200 while using system 100. Adaptive system 100 may track and store user key strokes and mouse clicks, as well as the time period in which these interactions occurred (e.g., timestamps), as captured usage information 202. From captured usage information 202, adaptive system 100 identifies usage behaviors 270 of users 200, e.g., a web page access or email transmission. Finally, usage aspect 220 includes usage-behavior pre-processing, in which usage behavior categories 249, usage behavior clusters 247, and usage behavioral patterns 248 are formulated for subsequent processing of usage behaviors 270 by adaptive system 100. Examples of usage behaviors 270 that may be processed by adaptive system 100, as well as usage behavior categories 249 designated by adaptive system 100, are listed in Table 1.

Usage behavior categories 249, usage behaviors clusters 247, and usage behavior patterns 248 may be interpreted with respect to a single user 200, or to multiple users 200; the multiple users may be described as a community, an affinity group, or a user segment. These terms are used interchangeably. A community is a collection of one or more users, and may include what is commonly referred to as a "community of interest." A sub-community is also a collection of one or more users, in which members of the sub-community include a portion of the users in a previously defined community. Communities, affinity groups, and user segments are described in more detail, below.

Usage behavior categories 249 include types of usage behaviors 270, such as accesses, referrals to other users, collaboration with other users, and so on. These categories and more are included in Table 1. Usage behavior clusters 247 are groupings of one or more usage behaviors 270, either within a particular usage behavior category 249 or across two or more usage categories. Usage behavior pre-processing 204 may also determine new clusters of user behaviors 270 in previously undefined usage behavior categories 249, across categories, or among new communities. Usage behavior patterns 248, also known as "usage behavioral patterns" or "behavioral patterns," are also groupings of usage behaviors 270 across usage behavior categories 249. Usage behavior patterns 248 are generated from filtered clusters of captured usage information 202.

Usage behavior patterns 248 may also capture and organize captured usage information 202 to retain temporal information associated with usage behaviors 270. Such temporal information may include the duration or timing of usage behaviors 270, such as those associated with reading or writing of written or graphical material, oral communications, including listening and talking, and/or monitored behaviors such as physiological responses, physical geographic location, and environmental conditions local to user 200. Usage behavioral patterns 248 may include segmentations and categorizations of usage behaviors 270 corresponding to a single user of users 200 or according to multiple users 200, e.g., communities or affinity groups. The communities or affinity groups may be previously established, or may be generated during usage behavior preprocessing 204 based on inferred usage behavior affinities or clustering. Usage behaviors 270 may also be derived from the use or explicit preferences associated with other adaptive or non-adaptive systems.

As shown in FIG. 2, adaptive system 100 generates adaptive recommendations 250 using adaptive recommendations function 240. Adaptive recommendations 250, suggestions, or communications, enable users to more effectively use, understand, and/or navigate adaptive system 100.

Adaptive recommendations 250 are presented as structural subsets of structural aspect 210, which may comprise an item of content, multiple items of content, a representation of users, and/or a user activity or stream of activities. The recommended content or activities may include information generated automatically by a processor-based system or device, such as a process control device. A recommendation may comprise a spatial or temporal sequence of objects. Adaptive recommendations 250 may be in the context of a currently conducted activity of system 100, a current position while navigating structural aspect 210, a currently accessed object 212 or information 232, or a communication with another user 200 or another system. Adaptive recommendations 250 may also be in the context of a historical path of executed system activities, accessed objects 212 or information 232, or communications during a specific user session or across user sessions. Adaptive recommendations 250 may be without context of a current activity, currently accessed object 212, current session path, or historical session paths. Adaptive recommendations 250 may also be generated in response to direct user requests or queries, including platform voice interface and search requests. Such user requests may be in the context of a current system navigation, access or activity, or may be outside of any such context and the recommended content sourced from one or more systems. Adaptive recommendations 250 may comprise advertising or sponsored content. Adaptive recommendations 250 may be delivered through any computer-implemented means, including delivery modes in which recommendation recipient 200, 260 can read and/or listen to recommendation 250 via platform voice interface.

Recommendations 250 may comprise a system's communication that references one or more objects or things that are identified in a video, the video being comprised of a sequence of images, with each image comprising pixels. Recommendation 250 may be generated and delivered in response to a user command or question, or based on an automatic inference that the user might have an interest in the object or knowing more about the object.

The objects in a video may be identified by applying machine learning-based techniques such as a computer-implemented neural network, such as a deep learning or a convolutional neural network, and/or by application of statistical or probabilistic-based approaches such as Bayesian probability-based models. Such methods of object identification may be augmented by inferences of preferences from behavioral information of the recipient of the recommendation. These methods of object identification may also be further augmented by application of behavioral chains and/or semantic chains for the purposes of understanding context with respect to an image or sequence of images, so as to facilitate the identification of objects and/or the context with which the objects are associated, the relationship with other objects identified in the image or sequence of images, or how the object is being used. The machine learning methods may also be augmented by any educational metadata assigned by content taggers and or automatically assigned by the platform\networks neural network.

The machine learning methods may also be augmented by the use of crowd sourcing on the revealit network whereby "content taggers" are incentivized to prospect using the revealit platform tagging and AI software tools to "mine" objects missing x/y co-ordinates from any frame until all objects per frame are found. "Content taggers" will be assigned property rights to the object as a result. Such right shall be equal to a percentage of the advertising revenue in perpetuity or for a specified value, time or NPV. The content taggers property rights shall be immutably written to the blockchain and the payment of royalties for use of the property by the revealit network shall be managed by a smart contract on the blockchain on behalf of the "content miner". Content taggers shall have the right to sell any property rights that they acquire on the network\platform only to other members of the platform\network and only as an active and current member of the network\platform. The machine learning methods may also be augmented by any educational metadata assigned by content taggers and or automatically assigned by the revealit platform\networks Neural network.

Figure 4:
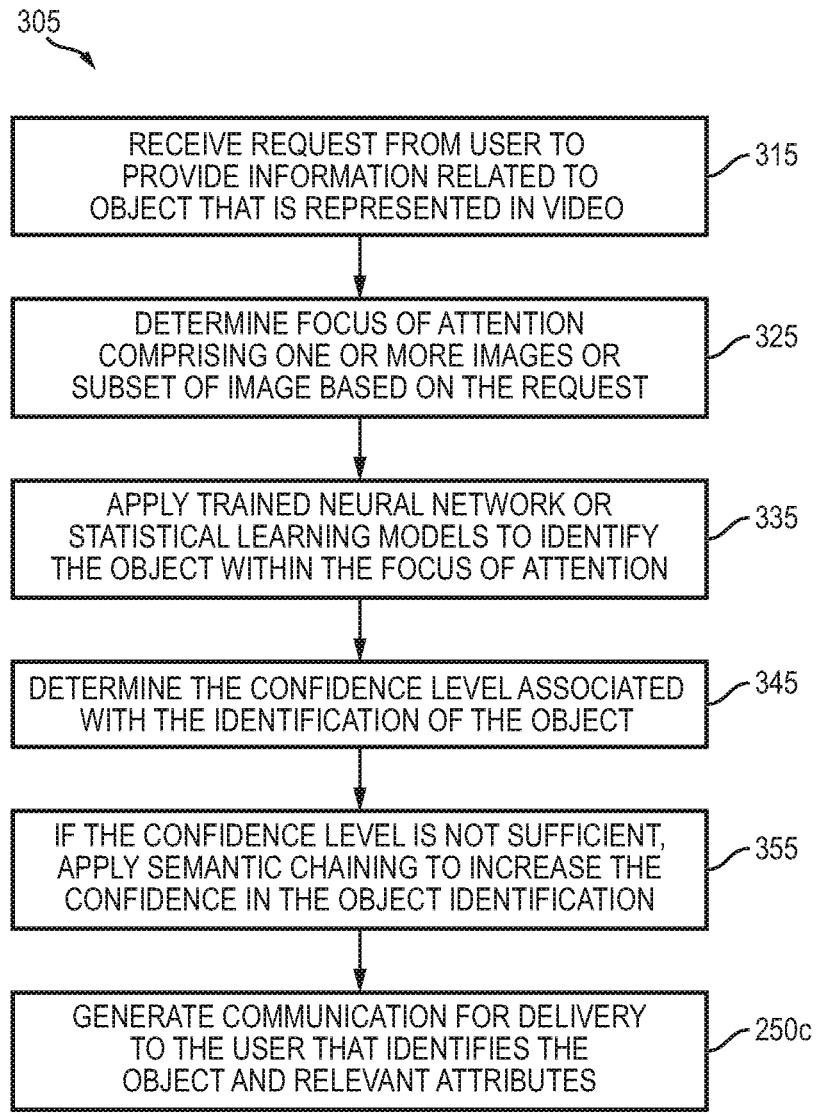
FIG. 4 is a flow diagram of identifying objects in a video and communicating to the user the identified object and associated attributes.

Adaptive system 100 performs the following steps in identifying and recommending objects in a video, as depicted in FIG. 4. In one embodiment, adaptive system 100 receives a request from user 200 to provide information about an object that is represented in video in block 315. In some cases, rather than an overt request by the user, system 100 may infer an interest of user 200 and proactively proceed to the step of the process. Based on the input from, or inference of interest of, user 200, adaptive system 100 determines a focus of attention comprising images, or region of pixels within one or more images in block 325. The focus of attention of adaptive system 100 may be directed to a particular image, and its associated pixels, of a video stream or a particular region of pixels of images of the video stream. The focus of attention may be in response to a user command, including a search command, or a user's interrogative, and/or may be inferred from user behaviors, which may be voluntary or involuntary behaviors or past behavior, including those behaviors that are described in Table 1. Behavioral and/or semantic chains may also be applied in determining the system's focus of attention. The image recognition process in adaptive system 100 may be directed by the video creator.

As an example, the user's command or interrogative could include a reference to an object, such as, "What is it that the player is throwing?" Alternatively, the video creator may have directions to "Note what the player is throwing." The system then parses the interrogative into noun and verb phrases and performs a match against images or sequence of images that are stored or in adaptive system 100, or that the system has been previously trained on, to determine a focus of intention of the system. Adaptive system 100 would search for pixel patterns in the video that matches pixel patterns of images that have been labeled "player" or variations thereof, and/or "player throwing," or variations thereof. Adaptive system 100 may narrow the search of its pixel evaluation region to serve as its focus of attention based on temporal considerations; if the user is currently viewing a video, then the search for matching pixel patterns might be limited to images of the video that have been displayed to the user in the last few seconds, since it could be inferred by the system that that is the time frame that the user's command or interrogative is likely directed to. Adaptive system 100 may also apply behavioral chains and/or semantic chains either as labels on a stored image set, or on a training image set to enable more sophisticated interpretations of a user's command or interrogative by application of semantic chaining processes, and/or for the purpose of making more sophisticated interpretations of the objects and/or the objects movements or actions within a video's images for the purposes of establishing the most appropriate focus of attention. Adaptive system 100 may apply one or more of the W1-type or W2-type weightings associated with behavioral and/or semantic chains in making interpretations or inferences of objects in determining an appropriate focus on attention.

Commands or interrogatives that influence the system's focus of attention are delivered to the system orally by the user in a natural language format, and are processed using audio processing hardware and software and natural language processing techniques. As in the example case above of the user asking, "What is it that the player is throwing," users may ask or otherwise direct the system's focus of attention by context rather than directly identifying an object that is represented in an image or sequence of images. Similarly, a user may direct the focus of attention of the system by specifying attributes of an object, such as by the example user interrogative directed to the system, "What is the blue sphere in the background?", whereby "blue" and "sphere" or "spherical" are attributes of the yet-to-be-identified object. Alternatively, commands or interrogatives that influence the system's focus of attention are delivered to the system by digital imprint from the video originator. At some point in the video stream, the digital imprint will provide the appropriate direction to adaptive system 100. The interface is capable because of the platforms unique ability to create a create a unique richly trained neural network to drive voice.

The green and blue dots on any frame of video can be overwhelming. By combining attribution data collected about the current viewer preferences both within the system and using external data, the balance of viewer's wallet can be used to highlight the commercial primary green dot group and the educational primary blue dot group of interest to the current viewer. Secondary and all other ancillary dot groups will be de-emphasized in the user interface. The primary dot groups can be highlighted by one or more combinations of (a) altering the luminance of dots in the preferred dot group, (b) altering the size of dots in the preferred dot group, (c) altering the color of dots in the preferred dot group, (d) altering the flash rate of dots in the preferred dot group, (e) choosing an adjacent frame that provides a more favourable plane of focus to dots in the preferred dot group, (f) choosing an adjacent scene that provides a more favourable plane of focus to dots in the preferred dot group, (g) offering the viewer the choice of an adjacent scene that provides a more favourable plane of focus to dots in the preferred dot group, (h) offering the viewer the choice of a similar scene in a different video that provides a better view of the same objects as dots in the preferred dot group, and (i) offering the viewer the choice of a similar scene in a different episode of the same video series that provides a better view of the same objects as dots in the preferred dot group. Any secondary or ancillary dot groups can be deemphasized by one or more combinations of (a) altering the luminance of dots in the secondary dot group, (b) altering the size of dots in the secondary dot group, (c) altering the color of dots in the secondary dot group, (d) altering the flash rate of dots in the secondary dot group, and (e) offering the viewers the choice to remove secondary dot groups.

If the group dot feature is enabled and users have chosen to opt in and share their attriubution data with the revealit platform then viewers will be rewarded whenever a primary dot group is displayed with a rev token micro payment credited to their wallet in return for signing their rights to that data over to the revealit network in perpetuity. All rev token payments credited to a viewer's wallet will only be fungible with vendors within the revealit network. Viewers may highlight any group of de-empahsized dots by a unique gesture, voice command or keyboard entry or mouse click. Viewers can choose to turn the dot groups feature off permanently in which case all dots will look the same and the viewers will not earn REV micropayments to their wallet. In determining the primary dot group a weighting preference will be expressed to those vendors who are prepared to offer viewers the greatest discount for their product by using the REV tokens in the viewers wallet. Dot groups may be sponored.

Adaptive system 100 may be able to respond to such object attribute-based user interrogatives directly by application of neural network or statistical learning approaches in some cases in which there exists a sufficiently rich training set. In many cases, however, adaptive system 100 may need to also apply semantic chains and associated chaining techniques to assist in identifying objects, or at least as an intermediate step, increasing a W3-type weighting associated with tentatively identified objects. Adaptive system 100 may be provided cues for facilitating its object identification by identifying verbs in the user's command or interrogative, as in the example described above with regard to the phrase, "What is it that the player is throwing?" whereby the verb "throw" or "throwing" provided an important cue in identifying the object referenced by the user in addition to the provided noun in the user communication, "player." Other examples of inferences of objects in images being influenced by identified verbs in user communications include user communications requesting the identification of objects in images whereby the communications include the verb "cooking," which could lead the system to more likely than would otherwise be the case to the user communication is directed to, say, a dish, utensil, or kitchen appliance. As another example, for a user communication that is directed to images, wherein the user communication includes the verb "wearing," adaptive system 100 is more likely than would otherwise be the case to assume the user communication is directed to, say, clothing or accessories.

A user communication to the system may reference an object or attribute of an object in association with other objects in an image or a sequence of images. For example, "What is the blue spherical object to the left of the pirate?" Or, "What is Jack Sparrow wearing?" Or, a user communication variation directed to the same image or sequence of images, "What is Johnny Depp wearing?" For these situations, adaptive system 100 may again be able to resolve such object attribute-based interrogatives directly by neural network or statistical learning approaches in block 335 in cases where there is a sufficiently rich training set. In other cases, however, adaptive system 100 may determine that there is not sufficient confidence in the identification of the object just based on the trained models in block 345. In such cases, adaptive system 100 may also apply semantic chains and associated chaining techniques to assist in identifying objects, or at least as an intermediate step, increasing a W3-type weighting associated with tentatively identified objects in block 355.

The focus of the system's attention can be based on inferences of interests, preferences, or user states of knowledge or expertise, which are in turn based on the system's knowledge or inference of the identity of the user who is communicating to the system. For example, identifying or inferring that the user who is communicating with adaptive system 100 is a child may lead the system to have a different focus of attention and/or object identification result than if the user was identified or inferred to be an adult. The identification can be bio physical inputs such as face detection, micro facial expressions, sentiment analsysis, iris detection and location, infered and derived presence information, and other information gathered from TOT sytems, mobile devices, in house products, environmental systems, cars, and GPS devices. Inferencing may be performed by vocal or audio recognition, behavioral, temporal, and gestural information, type of programming being consumed and visual information. More generally, where adaptive system 100 has access to behavioral information, such as the types of behavioral information described by Table 1, inferred user interests and/or preferences or states of knowledge may be taken into consideration by the system in determining a focus of attention and to facilitate identifying the object a user is referring to in a communication to the system. In the "What is it that the player is throwing," example, if the image or sequence of images that constitute a search space used in determining a system's focus of attention included pixel patterns consistent with a soccer player, e.g., a goalie, throwing a soccer ball as well as a baseball player throwing a baseball, but the system inferred a significant state of knowledge by the user associated with the sport of soccer but not with the sport of baseball, the system would be able to more confidently predict that the user was referring to the baseball player rather than the soccer player, all other things being equal. On the other hand, in a television program example in which multiple characters are on the screen and the user asks the system, "What is that jacket he is wearing now?", the system might be able to infer from behavioral information (and/or from previously inferred focuses of attention of the user and associated objects) and thereby resolve the ambiguity, if there is a sufficiently rich set of behavioral information to analyze, to determine which character the user's request for information is directed to.

The user can self-direct the interactive experience as desired from the anchor point of each element in each shot such that a user could choose to navigate a different side scenario or plot to the main plot that includes the product. The user can also choose to watch an advertisement for the product, see other scenes, episodes, and other series that display that product or a similar product, participate in an online role play game with other members of the platform that incorporates the product, participate in an online augmented reality game with other members of the platform that incorporates the product, participate in an online virtual reality game with other members of the platform that incorporates the product, and play an animated game that with other members of the platform that incorporates the product. In other embodiments, the user can choose to create review update Metadata about the product, review and rate the product, upload a video review of the product, add manuals or augmented reality assets to the product, and start a new content creation auction on the platform whereby you request a user generated video be made that includes the product.

In another embodiment, the user can choose to participate in an interactive viewer made movie made by multiple viewers on the network where the script is dynamic and self-directed by the group using social networking features, game theory using a token, voting likes and requested actions whereby the response is creation of or watching more videos which contain x/y anchor points with further clues or narrative direction choices including those embedded within experiences like virtual and augmented reality interactions resulting in a collaborative movie script creation process and user experience that uses brand interactions as part of that experience. The interactive viewer created video may be sponsored by brands who are willing to pay participants for using their product in the user made movies or experience.

Adaptive systems also respond to bio physical inputs such as presence, motion, eye movement, facial expression, and other data collected by the viewer by way of in-house devices and external systems, such as blockchain.

After the pixels that constitute the focus of attention are established, which may span multiple images, the pixels are further analyzed by the system. The analysis may be performed by application of a neural network. The neural network may be trained by means of a training set of labeled images, or labeled collections of pixels, whereby the labels constitute words or phrases, and the labels may constitute or include behavioral and/or semantic chains. The neural network can then identify objects within the focus of attention by matching the pixel patterns within the focus of attention with those of the images in the training set, and for sufficiently good matches, infer that the corresponding labels of the matched training set images applies to the focus of attention. A neural network might determine that for the subset of training images in which a player is labeled as throwing something, the further subset of training images in which that something is labeled a ball is the pixel pattern of a collection of pixels that best matches the pixel pattern of the focus of attention.

The neural network can be built from a transcript of the series, voice commands recorded from users, product information, contextual information, sentiment of the actors and the scene, and sentiment of the viewers. The neural network will provide better recomendation, retargeting, and attribution engine, as well as better voice driven user interface than is presently capable today given all data for voice interactions today do not take into account the detailed amount of contextual and product information.

It may be the case that application of a neural network may not by itself find a good enough match to confidently answer the interrogative, and adaptive system 100 may alternatively or additionally apply behavioral and/or semantic chains. For example, a semantic chain of the form, Baseball Players-Throw-Baseballs might be applied to infer that the player identified within the focus of attention is throwing a baseball. The system may apply the W1, W2, or W3-type weightings to make interpretations or inferences of objects within the focus on attention, and/or for assigning a level of confidence with respect to the interpretations or inferences.

In the third step, adaptive system 100 communicates to the user a communication 250c responsive to the user's command or interrogative that is based on the analysis performed by the previous steps. The communication may be in the form of natural language, and in written or audio formats. For the continuing example, adaptive system 100 might respond, "The player is throwing a baseball." Adaptive system 100 may include a variety of object attributes in the communication, either proactively or in response to follow-up interrogatives by the user. The attributes with respect to the identified or inferred object, the baseball, might include the color of the baseball, the size of the baseball, the fact that the same baseball has just been used to strike out the last batter, and so forth. These attributes may originate from the labels on image trainings sets, from databases, and/or based on behavioral and/or semantic chaining.

In some embodiments, such as for product promotional processes, adaptive system 100 places the identified object within a virtual reality or augmented reality overlay, such as, for example, Microsoft's Hololens product, so that the user can visualize the object in a setting or context of the user's choosing; or alternatively to the user overtly choosing, the system may infer, from, for example, user behaviors, an environment that the user is familiar with or that would be relevant to the user to serve as the setting or context for a virtual or augmented reality display that includes the object. For a product such as a lamp, along with specific attributes of the lamp, such as its brand, that is identified for a user, the product may be positioned within a virtual reality depiction or overlay of an area of the user's home.

A process that enables users to create a virtual dressing room from clothing and apparel worn by a person or persons displayed in video upon user request is described as follows. Upon a user request, such as, "dress my husband like Jack Sparrow from the scene", video recognition agent 52, also referred to herein as "Revealit", will detect and identify clothing and apparel in 3D, worn by Jack Sparrow through the specified scenes, through inferences from other scenes or from previous knowledge. Attributes (textures, sizing, relative features, fitting style) of clothing required for a fitting based on the scene will be determined. Using the augmented reality feature, the key features from the video are applied to the specified person's (e.g. husband) dimensions. The augmented reality feature provides an optional tailoring function whereby clothing apparel, based on the images contained in video can be adjusted, replaced or redesigned. The capability to create specifications from the augmented reality feature will provide designers the ability to manufacture clothing and apparel from the specifications.

Advertisers attribute products such as cosmetics, non-visible products, make-up, jewelry, hair products, piercings, tattoos, hair styles, contact lenses, perfumes, can be monetized to people associated with the products who are in video. The specific application will be used for product promotion; therefore, the attribution of information related to the associated products will be made during the content creation process. The object creation process for 2D objects can be the same as that for people. The following describes the attribution process of making available information to users and advertisers within Revealit. Miners are provided the capability to tag attribution data to people in videos. During video playback, people of interest, contained in video will be detected, and identified through Revealit facial recognition software. Upon user request, attribution data associated with the video will be displayed to the user.

Figure 5:
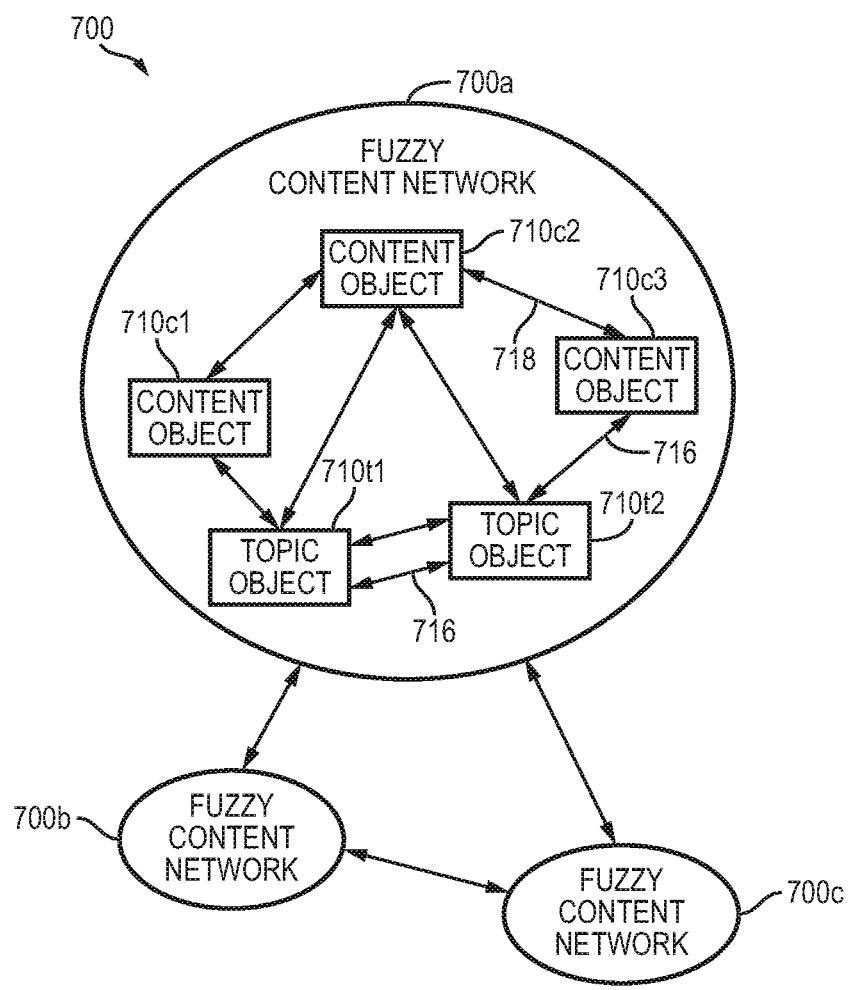
FIG. 5 illustrates a fuzzy content network-based system.
Figure 6A:
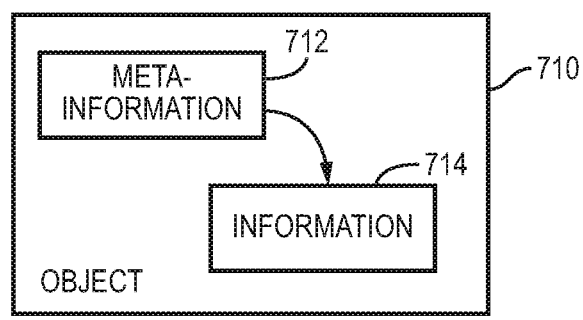
FIGS. 6a-6c illustrate an object, topic object, and content object.

Structural aspect 210 of adaptive system 100, comprises a specific type of fuzzy network, a fuzzy content network. Fuzzy content network 700 is depicted in FIG. 5. Fuzzy content network 700 may include multiple content sub-networks, as illustrated by content sub-networks 700a, 700b, and 700c, and fuzzy content network 700 includes "content," "data," or "information," packaged in objects 710. Details about how the object works internally may be hidden. In FIG. 6a, object 710 includes meta-information 712 and information 714. Object 710 thus encapsulates information 714.

Another benefit to organizing information as objects is known as inheritance. The encapsulation of FIG. 6a, for example, may form discrete object classes, with particular characteristics ascribed to each object class. A newly defined object class may inherit some of the characteristics of a parent class. Both encapsulation and inheritance enable a rich set of relationships between objects that may be effectively managed as the number of individual objects and associated object classes grows.

Figure 6B:
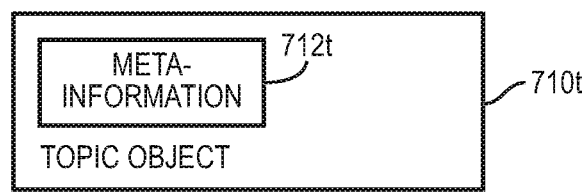
Figure 6C:
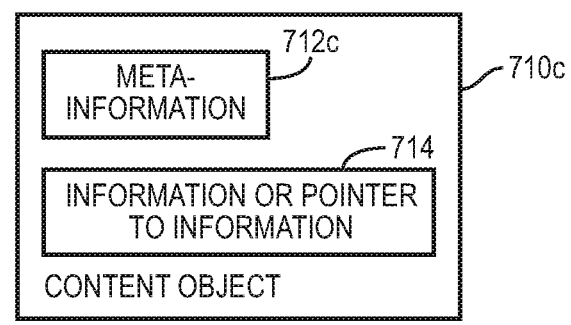

In content network 700, objects 710 may be either topic objects 710t or content objects 710c, as depicted in FIGS. 6b and 6c, respectively. Topic objects 710t are encapsulations that contain meta-information 712t and relationships to other objects (not shown), but do not contain an embedded pointer to reference associated information. Topic object 710t operates as a "label" to a class of information. Topic object 710 refers to "itself" and the network of relationships it has with other objects 710. People may be represented as topic objects or content objects in accordance with some embodiments.

Content objects 710c, as shown in FIG. 6c, are encapsulations that optionally contain meta-information 712c and relationships to other objects 710 (not shown). Additionally, content objects 710c may include either an embedded pointer to information or information 714 itself ("information 714").

The referenced information 714 may include files, text, documents, articles, images, audio, video, multi-media, software applications and electronic or magnetic media or signals. Where content object 714c supplies a pointer to information, the pointer may be a memory address. Where content network 700 encapsulates information on the Internet, the pointer may be a Uniform Resource Locator (URL).

Meta-information 712 supplies a summary or abstract of object 710. Meta-information 712t for topic object 710t may include a high-level description of the topic being managed. Examples of meta-information 712t include a title, a sub-title, descriptions of the topic provided at different levels of detail, the publisher of the topic meta-information, the date topic object 710t was created, and subjective attributes such as the quality, and attributes based on user feedback associated with the referenced information. Meta-information may also include a pointer to referenced information, such as a uniform resource locator (URL), in one embodiment.

Meta-information 712c for content object 710c may include relevant keywords associated with information 714, a summary of information 714, and so on. Meta-information 712c may supply a "first look" at objects 710c. Meta-information 712c may include a title, sub-title, description of the information 714, author of information 714, publisher of information 714, publisher of meta-information 712c, and date content object 710c was created. As with topic object 710t, meta-information for content object 710c may also include a pointer.

In FIG. 5, content sub-network 700a is expanded, such that both content objects 710c and topic objects 710t are visible. The various objects 710 of content network 700 are interrelated by degrees using relationships 716, such as unidirectional and bidirectional arrows, and relationship indicators 718 as values. Each object 710 may be related to any other object 710, and may be related by a relationship indicator 718, as shown. Thus, while information 714 is encapsulated in objects 710, information 714 is also interrelated to other information 714 by a degree manifested by relationship indicators 718.

Relationship indicator 718 is a type of affinity comprising a value associated with relationship 716, the value typically comprising a numerical indicator of the relationship between objects 710. Thus, relationship indicator 718 may be normalized to between 0 and 1, inclusive, where 0 indicates no relationship, and 1 indicates a subset or maximum relationship. Or, relationship indicators 718 may be expressed using subjective descriptors that depict the "quality" of the relationship. Subjective descriptors "high," "medium," and "low" may indicate a relationship between two objects 710.

Relationship 716 between objects 710 may be bi-directional, as indicated by the double-pointing arrows. Each double-pointing arrow includes two relationship indicators 718, one for each "direction" of the relationships between objects 710.

As FIG. 5 indicates, relationships 716 between any two objects 710 need not be symmetrical. That is, topic object 710t1 has a relationship of "0.3" with content object 710c2, while content object 710c2 has a relationship of "0.5" with topic object 710t1. Content object 710c1 has a relationship of "0.2" with content object 710c2, while content object 710c2 has a relationship of "0.8" with content object 710c1. Topic object 710t2 has a relationship of "0.1" with content object 710c3, while content object 710c3 has a relationship of "0.3" with topic object 710t2. Furthermore, the relationships 716 need not be bi-directional—they may be in one direction only, designated by a unidirectional arrow, or by simply setting one relationship indicator 718 of a bi-directional arrow to "0.0", the null relationship value.

The content networks 700a, 700b, 700c may be related to one another using relationships of multiple types and associated relationship indicators 718. In FIG. 5, content sub-network 700a is related to content sub-network 700b and content sub-network 700c, using relationships of multiple types and associated relationship indicators 718. Likewise, content sub-network 700b is related to content sub-network 700a and content sub-network 700c using relationships of multiple types and associated relationship indicators 718.

Individual content and topic objects 710 within a selected content sub-network 700a may be related to individual content and topic objects 710 in another content sub-network 700b. Further, multiple sets of relationships of multiple types and associated relationship indicators 718 may be defined between two objects 710.

A first set of relationships 716 and associated relationship indicators 718 may be used for a first purpose or be available to a first set of users while a second set of relationships 716 and associated relationship indicators 718 may be used for a second purpose or available to a second set of users. In FIG. 5, topic object 710t1 is bi-directionally related to topic object 710t2, not once, but twice, as indicated by the two double arrows. An indefinite number of relationships 716 and associated relationship indicators 718 may therefore exist between any two objects 710 in the fuzzy content network 700. The multiple relationships 716 may correspond to distinct relationship types. A relationship type might be the degree an object 710 supports the thesis of a second object 710, while another relationship type might be the degree an object 710 disconfirms the thesis of a second object 710. The content network 700 may thus be customized for various purposes and accessible to different user groups in distinct ways simultaneously.

The relationships among objects 710 in the content network 700, as well as the relationships between content networks 700a and 700b, may be modeled after fuzzy set theory. Each object 710 may be considered a fuzzy set with respect to all other objects 710, which are also considered fuzzy sets. The relationships among objects 710 are the degrees to which each object 710 belongs to the fuzzy set represented by any other object 710. Every object 710 in the content network 700 may conceivably have a relationship with every other object 710.

Topic objects 710t may encompass, and may be labels for, very broad fuzzy sets of content network 700. The topic objects 710t thus may be labels for the fuzzy set, and the fuzzy set may include relationships to other topic objects 710t as well as related content objects 710c. Content objects 710c, in contrast, typically refer to a narrower domain of information in content network 700.

Figure 7:
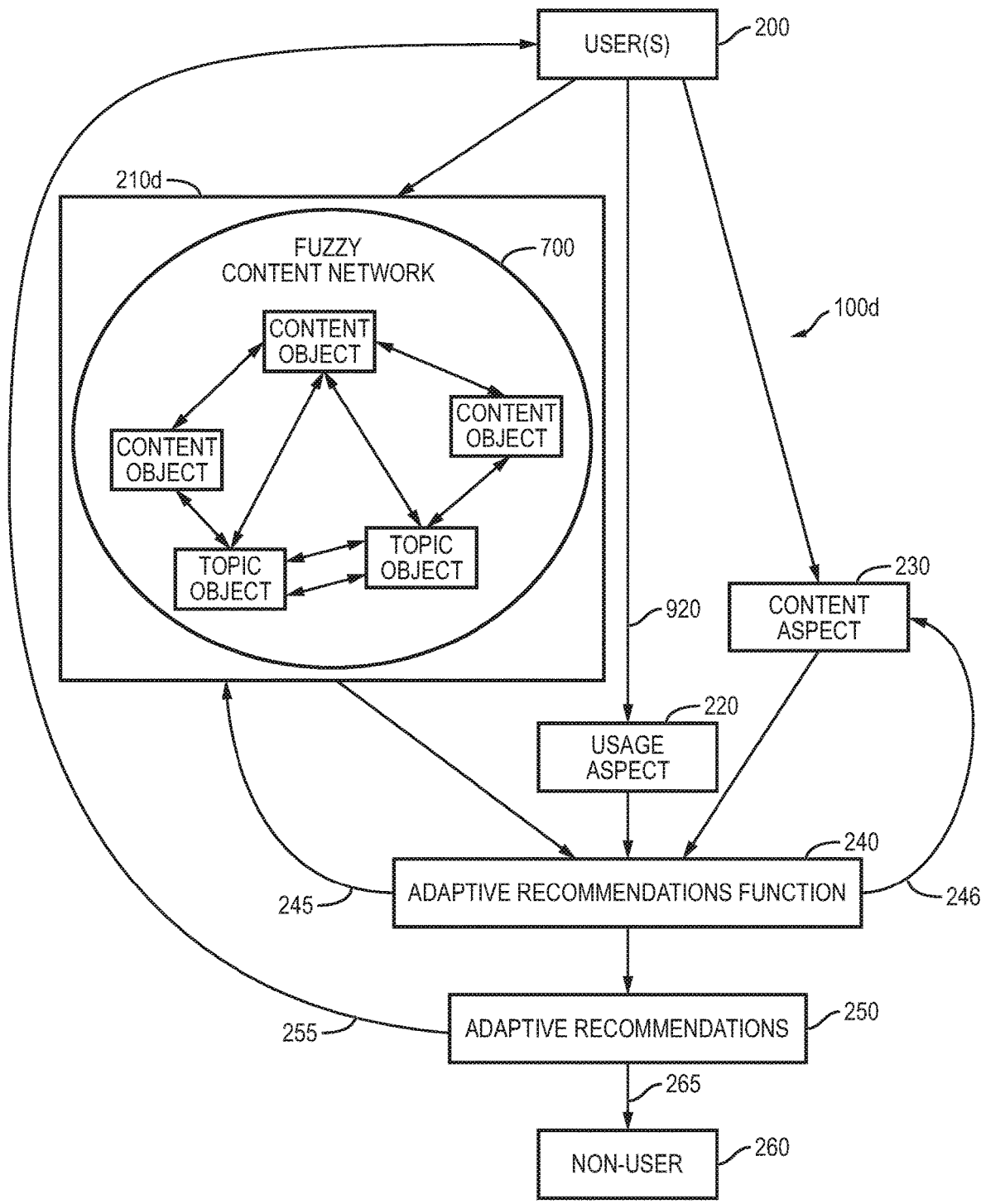
FIG. 7 illustrates a fuzzy content network-based adaptive system.

Adaptive system 100 of FIG. 2 may operate in association with a fuzzy content network environment, such as the one depicted in FIG. 5. In FIG. 7, adaptive system 100d includes a structural aspect 210d that is a fuzzy content network. Thus, adaptive recommendations 250 generated by the adaptive system 100d are also structural subsets that may themselves comprise fuzzy content networks.

A computer-implemented fuzzy network or fuzzy content network 700 may be represented in the form of vectors or matrices in a computer-implemented system, and where the vectors or matrices may be represented in the form of computer-implemented data structures such as relational databases or non-relational databases. The relationship indicators 718 or affinities among topics may be represented as topic-to-topic affinity vectors ("TTAV"). The relationship indicators 718 or affinities among content objects may be represented as content-to-content affinity vectors ("CCAV"). The relationship indicators 718 or affinities among content object and topic objects may be represented as content-to-topic affinity vectors ("CTAV"), which is also sometimes referred to as an object-to-topic affinity vector ("OTAV").

Further, affinity vectors between user 200 and objects of a fuzzy network or fuzzy content network 700 may be generated. A member or user-to-topic affinity vector ("MTAV") may be generated. An affinity vector ("MMAV") between a specific user and other users 200 may be generated derivatively from MTAVs and/or other affinity vectors. A member-topic expertise vector (MTEV) is generated, which is defined as a vector of inferred member or user 200 expertise level values, wherein each value corresponds to an expertise level corresponding to a topic.

One or more of object 212 relationship mappings 214 represented by TTAVs, CCAVs, CTAVs (or OTAVs), MTAVs or MTEVs may be the result of the behavioral indexing of structural aspect 210 (that is not necessarily fuzzy network-based) in conjunction with usage aspect 220 and adaptive recommendations function 240.

The indexes generated from information 232 within objects 212 may be applied to populate an MTAV and/or MTEV, and/or to modify an existing MTAV and/or MTEV. Computer-implemented algorithms may be applied to index objects 212 such that for each object 212 a vector or vectors comprising one or more constituent elements, such as words, phrases, or concepts, is generated, along with a numerical weight or value corresponding to each constituent element, wherein each of the corresponding weights is indicative of the inferred importance or relevance of each of the associated constituent elements with respect to associated indexed object 212. Such a vector or vectors may be generated by a search engine function during the process of indexing the contents 232 of object 212. The vector of constituent elements and associated weights or values, also referred to as "object contents vector," or "OCV," may be generated using pattern detection and/or statistical techniques such as Bayesian analytic approaches and/or other statistical pattern matching and/or statistical learning techniques such as support vector machines, as are known by those skilled in the art. For example, word or phrase frequencies within object 212 comprising a document will typically influence the OCV, as may the position of words or phrases within object 212. The object contents-indexing techniques may further apply more general linguistic data such as word and phrase frequencies for a given language, synonym tables, and/or other lexicon-based information in generating OCVs.

A system may track user's 200 behaviors, including the behaviors described by Table 1, and map them to the OCVs of a collection of objects 212. Constituent elements of the OCVs of objects that are inferred from the tracked behaviors to be of particular interest to users 200 or to have some other inferred quality of interest are then identified. These inferences may be based on the relative number of occurrences of constituent elements among objects that are inferred to be interest to a user, as well as in accordance with the weights or values associated with these constituent elements and their associated OCVs. Everything else being equal, constituent elements (or synonyms) of OCVs that occur frequently among the objects that are inferred to be of high interest to a user and that have relatively high relevance weightings in the OCVs are favored for identification.

These identified constituent elements may then be transformed via application of appropriate lexicon-based information and techniques into, or directly serve without transformation as, topic objects 710*t* with associated weights in the user's MTAV and/or MTEV, wherein the associated weights are calculated in accordance with the inferred degree of relationships among objects or affinity 214 between user 200 and objects 212 from which the associated OCVs are sourced. The process can be iteratively executed to continue to expand or refine the MTAV as additional or alternative sets of behaviors are applied to OCVs of the same, additional, or different sets of object 212, enabling continuously improved capabilities for personalization.

A multi-dimensional mathematical construct or space may be generated based on one or more of the affinity vectors. By way of example, topics may represent each dimension of a multi-dimensional space. Calculations of distances between objects and/or users in the multi-dimensional space, and clusters among objects and/or users, may be determined by applying mathematical algorithms to the multi-dimensional space and its elements. These calculations may be used by adaptive system 100 in generating recommendations and/or in clustering elements of the space.

Topic objects 710*t* and/or relationship indicators 718 may be generated automatically by evaluating candidate clusters of content objects 710*c* based on behavioral information and/or the matching of information within content objects 710*c*, wherein the matching is performed through the application of probabilistic, statistical, and/or neural network-based techniques.

In Table 1, a variety of different user behaviors are identified that may be assessed and categorized by computer-based systems 925. Usage behaviors may be associated with the entire community of users, one or more sub-communities, or with individual users of the one of more computer-based applications on system 925.

TABLE 1

Usage Behavior Categories and Usage Behaviors

| Usage Behavior Category | Usage Behavior Examples |
| --- | --- |
| navigation and access | activity, content and computer application accesses, including buying/selling<br>paths of accesses or click streams<br>execution of searches and/or search history |
| subscription and self-profiling | personal or community subscriptions to, or following of, topical areas<br>interest and preference self-profiling<br>following other users<br>filters<br>affiliation self-profiling (e.g., job function) |
| collaborative | referral to others<br>discussion forum activity<br>direct communications (voice call, messaging)<br>content contributions or structural alterations<br>linking to another user |
| reference | personal or community storage and tagging<br>personal or community organizing of stored or tagged information |
| direct feedback | user ratings of activities, content, computer applications and automatic recommendations<br>user comments |
| physiological responses | direction of gaze<br>pupil positioning/dilation<br>brain patterns<br>blood pressure<br>heart rate<br>voice modulation<br>facial expression<br>kinetic expression of limbs such as tension, posture or movement<br>expression of other users in the group |
| environmental conditions and location | current location<br>location over time<br>relative location to users/object references<br>current time<br>current weather condition |

A first category of process usage behaviors is known as system navigation and access behaviors. System navigation and access behaviors include usage behaviors such as accesses to, and interactions with computer-based applications and content such as documents, Web pages, images, videos, TV channels, audio, radio channels, multi-media, interactive content, interactive computer applications and games, e-commerce applications, or any other type of information item or system "object." The process usage behaviors may be conducted through use of a keyboard, mouse, oral commands, or using any other input device. Usage behaviors in the system navigation and access behaviors category may include the viewing, scrolling through, or reading of displayed information, typing written information, interacting with online objects orally, or combinations of these forms of interactions with computer-based applications. The usage behaviors category includes the explicit searching for information, using a search engine. The search term may be in the form of a word or phrase to be matched against documents, pictures, web-pages, or any other form of on-line content. Alternatively, the search term may be posed as a question by the user.

System navigation and access behaviors may also include executing transactions, including commercial transactions, such as the buying or selling of merchandise, services, or financial instruments. System navigation and access behaviors may include not only individual accesses and interactions, but the capture and categorization of sequences of information or system object accesses and interactions over time.

A second category of usage behaviors is known as subscription and self-profiling behaviors. Subscriptions may be associated with specific topical areas or other elements of computer-based systems 925, or may be associated with any other subset of computer-based systems 925. "Following" is another term that may be used for a subscription behavior, i.e., following a topic is synonymous with subscribing to a topic. Subscriptions or following behaviors may also be, with regard to other users, the subscriber or follower receiving activity streams of the subscribed to or followed user. A user's following behavior is distinguished from a linking behavior with regard to another user in that a following relationship is asymmetric, while a linking (e.g., "friending") relationship is typically symmetric (and hence linking is considered in the collaborative behavior category). Subscriptions may thus indicate the intensity of interest with regard to elements of computer-based systems 925. The delivery of information to fulfill subscriptions may occur online, such as through activity streams, electronic mail (email), on-line newsletters, XML, or RSS feeds, etc., or through physical delivery of media.

Self-profiling refers to other direct, persistent (unless explicitly changed by the user) indications explicitly designated by users 200 regarding their preferences and/or intentions and interests, or other meaningful attributes. User 200 may explicitly identify interests or affiliations, such as job function, profession, or organization, and preferences and/or intentions, such as representative skill level (e.g., novice, business user, advanced). Self-profiling enables computer-based systems 925 to infer explicit preferences and/or intentions of the user. A self-profile may contain information on skill levels or relative proficiency in a subject area, organizational affiliation, or a position held in an organization. User 200 that is in the role, or potential role, of a supplier or customer may provide relevant context for effective adaptive e-commerce applications through self-profiling. A potential supplier may include information on products or services offered in his or her profile. Self-profiling information may be used to infer preferences and/or intentions and interests with regard to system use and associated topical areas, and with regard to degree of affinity with other user community subsets. User 200 may identify preferred methods of information receipt or learning style, such as visual or audio, as well as relative interest levels in other communities.

A third category of usage behaviors is known as collaborative behaviors. Collaborative behaviors are interactions among users 200. Collaborative behaviors may thus provide information on areas of interest and intensity of interest. Interactions including online referrals of elements or subsets of computer-based systems 925, such as through email, whether to other users or to non-users, are types of collaborative behaviors obtained by computer-based systems 925.

Other examples of collaborative behaviors include online discussion forum activity, contributions of content or other types of objects to computer-based systems 925, posting information that is then received by subscribers, categorizing subscribers so as to selectively broadcast information to subscribers, linking to another user, or any other alterations of the elements, objects or relationships among the elements and objects of computer-based systems 925. Collaborative behaviors may also include general user-to-user communications, whether synchronous or asynchronous, such as email, instant messaging, interactive audio communications, and discussion forums, as well as other user-to-user communications that can be tracked by computer-based systems 925.

A fourth category of process usage behaviors is known as reference behaviors. Reference behaviors refer to the marking, designating, saving or tagging of specific elements or objects of computer-based systems 925 for reference, recollection or retrieval at a subsequent time. An indicator such as "like" is a reference behavior when used as a tag for later retrieval of associated information. Tagging may include creating symbolic expressions, such as a word or words (e.g., a hashtag), associated with the corresponding elements or objects of computer-based systems 925 for the purpose of classifying the elements or objects. The saved or tagged elements or objects may be organized in a manner customizable by users. The referenced elements or objects, as well as the manner in which they are organized by users 200, may provide information on inferred interests of the users and the associated intensity of the interests.

A fifth category of process usage behaviors is known as direct feedback behaviors. Direct feedback behaviors include ratings or other indications of perceived quality by individuals of specific elements or objects of computer-based systems 925, or the attributes associated with the corresponding elements or objects. The direct feedback behaviors may therefore reveal the explicit preferences and/or intentions of the user. In computer-based systems 925, the recommendations 250 may be rated by users 200, which enables a direct, adaptive feedback loop, based on explicit preferences and/or intentions specified by the user. Direct feedback also includes user-written comments and narratives associated with elements or objects of computer-based system 925.

A sixth category of process usage behaviors is known as physiological responses. These responses or behaviors are associated with the focus of attention of users and/or the intensity of the intention, or any other aspects of the physiological responses of users 200. The direction of the visual gaze of users 200 may be determined. The behavior can inform inferences associated with preferences and/or intentions or interests even when no physical interaction with computer-based systems 925 is occurring. Even more direct assessment of the level of attention may be conducted through access to the brain patterns or signals associated with users 200. Such patterns of brain functions during participation in a process can inform inferences on the preferences and/or intentions or interests of users, and the intensity of the preferences and/or intentions or interests. The brain patterns assessed may include MRI images, brain wave patterns, relative oxygen use, or relative blood flow by regions of the brain.

Physiological responses may include any other type of physiological response of user 200 that may be relevant for making preference or interest inferences, independently, or collectively with the other usage behavior categories. Other physiological responses may include utterances, vocal range, intensity and tempo, gestures, movements, or body position. Attention behaviors may also include other physiological responses such as breathing rate, heart rate, temperature, blood pressure, or galvanic response.

A seventh category of process usage behaviors is known as environmental conditions and physical location behaviors. Physical location behaviors identify geographic location and mobility behaviors of users. The location of a user may be inferred from information associated with a Global Positioning System or any other position or location-aware system or device, or may be inferred directly from location information input by a user (e.g., inputting a zip code or street address, or through an indication of location on a computer-implemented map), or otherwise acquired by computer-based systems 925. The physical location of objects referenced by elements or objects of computer-based systems 925 may be stored for future reference. Proximity of a user to a second user, or to objects referenced by elements or objects of the computer-based application, may be inferred. The length of time, or duration, at which users reside in a particular location may be used to infer intensity of interests associated with the particular location, or associated with objects that have a relationship, such as proximity, to the physical location. Derivative mobility inferences may be made from location and time data, such as the direction of the user, the speed between locations or the current speed, the likely mode of transportation used, and the like. The derivative mobility inferences may be made in conjunction with geographic contextual information or systems, such as through interaction with digital maps or map-based computer systems. Environmental conditions may include the time of day, the weather, the temperature, the configuration of physical elements or objects in the surrounding physical space, lighting levels, sound levels, and any other condition of the environment around users 200.

In addition to the usage behavior categories depicted in Table 1, usage behaviors may be categorized over time and across user behavioral categories. Temporal patterns may be associated with each of the usage behavioral categories. Temporal patterns associated with each of the categories may be tracked and stored by computer-based systems 925. The temporal patterns may include historical patterns, including how recently an element, object or item of content associated with computer-based systems 925. More recent behaviors may be inferred to indicate more intense current interest than less recent behaviors.

Another temporal pattern that may be tracked and contribute to derive preference inferences is the duration associated with the access or interaction with, or inferred attention toward, the elements, objects or items of content of computer-based systems 925, or the user's physical proximity to objects referenced by system objects of computer-based systems 925, or the user's physical proximity to other users. Longer durations may generally be inferred to indicate greater interest than short durations. In addition, trends over time of the behavior patterns may be captured to enable more effective inference of interests and relevancy. Since delivered recommendations may include elements, objects, or items of content of computer-based systems 925, the usage pattern types and preference inferencing may also apply to interactions of users 200 with the delivered recommendations 250 themselves, including accesses of, or interactions with, explanatory information regarding the logic or rationale that computer-based systems 925 used in deciding to deliver the recommendation to the user.

Adaptive communications 250*c* or recommendations 250 may be generated for users 200 through the application of affinity vectors. Member-Topic Affinity Vectors (MTAVs) may be generated to support effective recommendations, wherein for user or registered member 200 of computer-based systems 925, a vector is established that indicates the relative affinity (which may be normalized to the [0,1] continuum) the member has for object sub-networks the member has access to. For computer-based systems 925 comprising a fuzzy content network-based structural aspect, the member affinity values of the MTAV may be in respect to topic networks.

So in general, for each identified user, which can be termed a registered member, e.g., member M, a hypothetical MTAV could be of a form of Table 2 as follows:

TABLE 2

MTAV for Member M

| Topic 1 | Topic 2 | Topic 3 | Topic 4 | ... | Topic N |
|---------|---------|---------|---------|-----|---------|
| 0.35 | 0.89 | 0.23 | 0.08 | ... | 0.14 |

The MTAV will therefore reflect the relative interests of a user with regard to all N of the accessible topics. The vector can be applied to serve as a basis for generating adaptive communications 250*c* or recommendations 250 to user 200, and to serve as a basis for comparing the interests with one member 200 with another member 200, and to determine how similar the two members are.

An expertise vector (MTEV) may be used as a basis for generating recommendations of people with appropriately inferred levels of expertise, rather than, or in addition to, using an MTAV. That is, the values of an MTEV correspond to inferred levels of expertise, rather than inferred levels of interests, as in the case of an MTAV.

To generate a MTAV or MTEV, any of the behaviors of Table 1 may be utilized. For example, behavioral information, such as (1) the topics the member has subscribed to received updates, (2) the topics the member has accessed directly, (3) the accesses the member has made to objects that are related to each topic, and (4) the saves or tags the member has made of objects that are related to each topic, may be used in generating MTAV.

The behavioral information is listed above in a generally reverse order of importance from the standpoint of inferring member interests; that is, access information gathered over a significant number of accesses or over a significant period of time will generally provide better information than subscription information, and saved information is typically more informative of interests than just accesses.

Fuzzy network structural information, such as (a) the relevancies of each content object to each topic, and (b) the number of content objects related to each topic, may also be used to generate MTAV values.

Personal topics that are not shared with other users 200 may be included in MTAV calculations. Personal topics that have not been made publicly available cannot be subscribed to by all other members, and so could be unfairly penalized versus public topics. Therefore, for the member who created the personal topic and co-owners of that personal topic, the subscription vector may be set to "True," i.e., 1. There may exist personal topics that are created by user 200 and that have never been seen or contributed to by any other member. Recommendations 250 may not otherwise be affected since the objects within that personal topic may be accessible by other members, and any other relationships these objects have to other topics will be counted toward accesses of these other topics.

The first step of the MTAV calculation is to use behavioral information (1)-(4) above to generate the following table or set of vectors for the member, as depicted in the following hypothetical example:

TABLE 3a

| Member 1 Behaviors | Topic 1 | Topic 2 | Topic 3 | Topic 4 | ... | Topic N |
|---------------------|---------|---------|---------|---------|-----|---------|
| Subscriptions | 1 | 1 | 0 | 0 | | 1 |
| Topic Accesses | 14 | 3 | 57 | 0 | | 8 |

TABLE 3a-continued

| Member 1 Behaviors | Topic 1 | Topic 2 | Topic 3 | Topic 4 | ... | Topic N |
|---|---|---|---|---|---|---|
| Weighted Accesses | 112 | 55 | 23 | 6 | | 43 |
| Weighted Saves | 6 | 8 | 4 | 0 | ... | 2 |

The subscriptions vector of Table 3a contains either a 1 if the member has subscribed to a topic or is the owner/co-owner of a personal topic or a 0 if the member has not subscribed to the topic. The topic accesses vector contains the number of accesses to that topic's explore page by the member to a topic over a period of time, for example, the preceding 12 months.

The weighted accesses vector of Table 3a contains the number of the member's (Member 1) accesses over a specified period of time of each object multiplied by the relevancies to each topic summed across all accessed objects. If Object 1 has been accessed 10 times in the last 12 months by Member 1 and it is related to Topic 1 by 0.8, and Object 2 has been accessed 4 times in the last 12 months by Member 1 and is related to Topic 1 at relevancy level 0.3, and these are the only objects accessed by Member 1 that are related to Topic 1, then Topic 1 would contain the value 10*0.8+4*0.3=9.2.

The weighted saves vector of Table 3a works the same way as the weighted accesses vector, except that it is based on Member 1's object save data instead of access data. Topic object saves are counted in addition to content object saves. Since a member saving a topic typically is a better indicator of the member's interest in the topic than just saving an object related to the topic, it may be appropriate to give more "credit" for topic saves than just content object saves. When a user saves a topic object, the following process may be applied: if the subscriptions vector indicator is not already set to "1" in Table 3a, it is set to "1". The advantage is that even if the topic has been saved before 12 months ago, the user will still at least get subscription "credit" for the topic save even if they don't get credit for the next two calculations.

In a similar way as a saved content object, a credit is applied in the weighted accesses vector of Table 3a based on the relevancies of other topics to the saved topic. A special "bonus" weighting in the weighted accesses vector of Table 3a may be applied with respect to the topic itself using the weighting of "10"—which means a topic save is worth at least as much as 10 saves of content that are highly related to that topic.

The next step is to make appropriate adjustments to Table 3a. For example, it may be desirable to scale the weighted accesses and weighted saves vectors by the number of objects that is related to each topic. The result is the number of accesses or saves per object per topic, which is a better indicator of intensity of interest because it is not biased against topics with few related objects. However, per object accesses/saves alone could give misleading results when there are very few accesses or saves. So as a compromise, the formula that is applied to each topic, e.g., topic N, may be a variation of the following:

((Weighted Accesses for Topic N)/(Objects related to Topic N))*Square Root(Weighted Accesses for Topic N)

The above formula emphasizes per object accesses, but is tempered with a square root factor associated with the absolute level of accesses by the member. The result is Table 3b of the form:

TABLE 3b

| Member 1 Behaviors | Topic 1 | Topic 2 | Topic 3 | Topic 4 | ... | Topic N |
|---|---|---|---|---|---|---|
| Subscriptions | 1 | 1 | 0 | 0 | | 1 |
| Topic Accesses | 14 | 3 | 57 | 0 | | 8 |
| Weighted Accesses | 9.1 | 12 | 3.2 | 0.6 | | 2.3 |
| Weighted Saves | 0.9 | 1.3 | 1.1 | 0 | ... | 0.03 |

The next step is to transform Table 3b into a MTAV. Indexing factors, such as the following may be applied:

TABLE 3c

| Topic Affinity Indexing Factors | Weight |
|---|---|
| Sub scribe Indexing Factor | 10 |
| Topic Indexing Factor | 20 |
| Accesses Indexing Factor | 30 |
| Save Indexing Factor | 40 |

These factors have the effect of ensuring normalized MTAV values ranges (e.g., 0-1 or 0-100) and enable more emphasis on behaviors that are likely to provide relatively better information on member interests. The calculations for each vector of Table 2b are transformed into corresponding Table 2a vectors as follows:

1. Table 4 Indexed Subscriptions for a topic by Member 1=Table 3b Subscriptions for a topic*Subscribe Indexing Factor.
2. Table 4 Indexed Direct Topic Accesses by Member 1=Table 3b Topic Accesses*Topic Indexing Factor.
3. Table 4 Indexed Accesses for a topic by Member 1=((Table 3b Weighted Accesses for a topic by Member 1)/(Max(Weighted Accesses of all Topics by Member 1)))*Accesses Indexing Factor.
4. Table 4 Indexed Saves for a topic by Member 1=((Table 3b Weighted Saves for a topic by Member 1)/(Max (Weighted Saves of all Topics by Member 1)))*Saves Indexing Factor.

The sum of the vectors results in the MTAV for the associated member 200 as shown in the hypothetical example of Table 4 below:

TABLE 4

| Member 1 Indexed Behaviors | Topic 1 | Topic 2 | Topic 3 | Topic 4 | ... | Topic N |
|---|---|---|---|---|---|---|
| Subscriptions | 0 | 10 | 10 | 10 | | 10 |
| Topic Accesses | 5 | 1 | 20 | 0 | | 8 |
| Weighted Accesses | 11 | 1 | 30 | 12 | | 6 |
| Weighted Saves | 0 | 10 | 40 | 1 | | 2 |
| Member 1 MTAV | 16 | 22 | 100 | 23 | ... | 26 |

Member-to-member affinities can be derived by comparing the MTAVs of a first member 200 and a second member 200. Statistical operators and metrics such as correlation coefficients or cosine similarity may be applied to derive a sense of the distance between members in n-dimensional topic affinity space, where there are N topics. Since different users may have access to different topics, the statistical correlation for a pair of members is preferentially applied against MTAV subsets that contain only the topics that both members have access to. A member-to-member affinity vector (MMAV) can be generated for each member or user 200, and the most similar members, the least similar members, etc., can be identified for each member 200. A member-to-member expertise vector (MMEV) may be analogously generated by comparing the MTEVs of a pair of users 200 and applying correlation methods.

With the MTAVs, MMAVs, and most similar member information available, a set of candidate objects to be recommended can be generated in accordance with some embodiments. These candidate recommendations may, in a later processing step, be ranked, and the highest ranked to candidate recommendations will be delivered to recommendation recipient 200, 260. Recall that recommendations 250 may be in-context of navigating computer system 925 or out-of-context of navigating the computer system.

A variation of the out-of-context recommendation process may be applied for in-context recommendations, where the process places more emphasis of the "closeness" of the objects to the object being viewed in generating candidate recommendation objects. For both out-of-context and in-context recommendations, a ranking process may be applied to the set of candidate objects, according to some embodiments. The following is an exemplary set of input information that may be used to calculate rankings.

1. Editor Rating: If there is no editor rating for the object, value is set to a default.
2. Community Rating (If there is no community rating for the object, value can be set to a default).
3. Popularity: Indexed popularity (e.g., number of views) of the object.
4. Change in Popularity: Difference in indexed popularity between current popularity of the object and the object's popularity some time ago.
5. Influence: Indexed influence of the object, where the influence of an object is calculated recursively based on the influence of other objects related to the object, weighted by the degree of relationship to the object, and where the initial setting of influence of an object is defined as its popularity.
6. Author's Influence: Indexed influence of the highest influence author (based on the sum of the influences of the author's content) of the content referenced by the object.
7. Publish Date: Date of publication of the object.
8. Selection Sequence Type: An indicator of the sequence step in which the candidate object was selected.
9. Object Affinity to MTAV: The indexed vector product of the Object-Topic Affinity Vector (OTAV) and the MTAV. The values of the OTAV are just the affinities or relevancies between the object and each topic, which may be derived from behavioral and/or contents indexing processes.

A ranking is then developed based on applying a mathematical function to some or all input items listed directly above, and/or other inputs not listed above. User or administrator-adjustable weighting or tuning factors may be applied to the raw input values to tune the object ranking appropriately. These recommendation preference settings may be established directly by the user, and remain persistent across sessions until updated by the user.

Some examples of weighting factors that can be applied dynamically by a user 200 or administrator include change in popularity ("What's Hot" factor), recency factor, and object affinity to MTAV (personalization factor).

Another example tuning factor that may be applied by user 200 or administrator is contextual affinity, which is the degree of affinity of the object that is providing the context for the recommendation and its affinity to other objects, wherein the affinities are determined by means of applying its CTAV, or by comparison of its OCV to the OCVs of other objects. These weighting factors could take any value (but might be typically in the 0-5 range) and could be applied to associated ranking categories to give the category disproportionate weightings versus other categories. The weighting factors can provide control over how important change in popularity, freshness of content, and an object's affinity with the member's MTAV are in ranking the candidate objects.

The values of the weighting factors are combined with the raw input information associated with an object to generate a rating score for each candidate object. The objects can then be ranked by their scores and the highest scoring set of X objects, where X is a defined maximum number of recommended objects, can be selected for delivery to a recommendation recipient 200, 260. Scoring thresholds may be set and used in addition to just relative ranking of the candidate objects. The scores of the recommended objects may also be used by computer-based system 925 to provide to the recommendation recipient a sense of confidence in the recommendation. Higher scores would warrant more confidence in the recommendation of an object than would lower scores.

Other types of recommendation tuning factors may be applied by user 200 or administrator. The scope of a social network, such as degrees of separation, may be adjusted so as to influence recommendations 250, and/or relationship types or categories of social relationships may be selected to tune recommendations 250. Recommendation recipients 200 or administrators may also or alternatively be able to restrict objects 212 representing other specified users 200 from being recommended, or restrict objects authored or otherwise having an affiliation with other specified users.

The scope of geography or distance from a current location, including the expected time to travel from the existing location to other locations, may be tuned or adjusted so as to influence recommendations 250. The expected time to travel may be a function of the actual or inferred mode of transportation of the recommendation recipient, road conditions, traffic conditions, and/or environmental conditions such as the weather. The specification of scope of geography, distance, and/or time-to-travel may be via an automated monitoring or inference of the recommendation recipient's current location, or may be via an explicit indication of location by the recommendation recipient through entering a location designation such as a zip code, or by indicating a location on a graphical representation of geography by indication location on a computer-implemented map display.

Other tuning factors that may be applied to influence recommendations 250 include the ability for the recommendation recipient to select a recommendation recipient mood or similar type of "state of mind" self-assessment that influences the generation of a recommendation. A recommendation recipient might indicate the current state of mind is "busy," and less frequent and more focused recommendations 250 could be generated as a consequence.

The amount and/or quality of usage behavioral information on which the respective MTAV affinity values of the two users is based may additionally influence the generated recommendation 250. Specifically, in the above example, if the affinity values of the second user's MTAV corresponding to the topical areas are relatively low and there is relatively little behavioral information on which the affinity values are based, then there is even greater motivation to recommend objects 212 with relatively high OTAV values associated with the topical areas to the second user. There is incrementally greater value in learning more about the user's interest than if the low affinities were based on inferences from a larger body of behavioral information, as well as there being a less likelihood of providing recommendation 250 that is truly not of interest to the user.

Semantic approaches, as exemplified by the Resource Description Framework (RDF), refer to system relationships that are represented in the form of a subject-predicate-object chain (a syntactic "triple"), wherein the predicate is typically a descriptive phrase, but can be a verb phrase, that semantically connects the subject with the object of the predicate. Since the subject and the object of the predicate can be represented as computer-implemented objects 212, semantic chains can represent computer-implemented object-to-object relationships that are informed by the associated predicate in the semantic chain. Most generally, subjects, predicates, and objects of the predicates of semantic chains can each be represented in computer-based system 925 as computer-implemented objects 212. Semantic chains may be established manually, but can also be generated automatically by computer-based system 925 through natural language processing (NLP) techniques that are applied to text strings such as sentences within computer-implemented object 212 so as to automatically decompose the text into semantic triples. Additional or alternative automatic techniques that can be applied by computer-based system 925 to extract semantic chains from natural language can include generating vectors of values for language elements such as words or phrases within objects 212, and generating relationships based on vector comparisons among these language elements. Text can additionally or alternatively also be automatically analyzed through the application of a graphical-based logical form in which elements of text are represented as nodes and edges of the graph represent grammatical relationships to derive semantic chains. Semantic chains that are derived from natural language using these or other techniques known in the art may then be linked or chained together. More generally, semantic chains can be represented by predicate calculus, and it should be understood that processes disclosed with respect to semantic chains apply more generally to predicate calculus-based representations.

Weightings, which may comprise probabilities, can be applied to semantic chains. For example, the semantic chain Object(1)-Predicate(1)-Object(2) may have a weighting (which may be normalized to the range 0-1), "W1" assigned to it: W1(Object(1)-Predicate(1)-Object(2)). Such a weighting (which may be termed a "W1-type" weight or probability) may correspond to a probabilistic confidence level associated with the semantic chain. The weighting may be calculated by inferential statistical means based upon content-based patterns and/or user behavioral patterns (such as word or phrase matching frequency and/or length matched chain sub-elements). The semantic chain "Red Sox-is a-team" might be assigned a weighting of 0.80 based on an inferential confidence given a first set of textual content from which the semantic chain is statistically inferred (and where "textual" or "text" may be in written or audio language-based forms). The weighting might be increased, say to 0.99, based on an analysis of additional text that seems to strongly confirm the relationship. Such weightings may therefore be considered probabilities that the inference is true, that is, the probability that the inference accurately reflects objective reality. It should be understood that such probabilistic inferences with respect to semantic chains may be made based on inputs other than just through the analytic processing of text-based computer-implemented objects. Such inferences can be alternatively or additionally made with respect to patterns of information that are identified with respect computer-implemented objects 212 comprising images or audio-based information. Neural network-based systems are trained to make inferences of relevant semantic chains from text and/or images to inform W1-type weights associated with the inferred semantic chains. Bayesian program learning-based processes are applied to make inferences of relevant semantic chains from text and/or images and to inform W1-type weights associated with the inferred semantic chains.

In addition, or alternatively, a contextual weighting, "W2", may be applied that weights the semantic chain based on the relative importance or relevance of the relationships described by the semantic chain versus other relationships with respect to one or both of the objects (which may be included in other semantic chains) within the semantic chain (and such weights may be termed a "W2-type" weight). A W2-type weight as applied to the semantic chain "Red Sox-is a-team" may be greater than the W2-type weight applied to the semantic chain "Red Sox-is a-logo" for a particular inferential application. While both semantic chains may be valid and accurately reflect objective reality, the term "Red Sox" as used in a randomly selected item of content is more likely to be used in the context of being a team than as being used in the context of being a logo, and should therefore, everything else being equal, be more likely to be used as a basis for subsequent computer-implemented semantic interpretations of content that includes a reference to "Red Sox". As in the case of W1-type weights, W2-type weights may correspond to probabilities, and may be established and/or adjusted based on statistical inferences from content (based on the frequency of co-occurrences of the respective objects in the semantic chain within a corpus of content) and/or from inferences derived from user 200 behaviors as described in Table 1. Alternatively, W2-type weightings may be explicitly established by humans.

So, in summary, whereas weightings of the type associated with W1 can be construed to be the probability that the associated semantic chain accurately reflects objective reality, weightings of the type associated with W2 can be construed to be the probability the associated semantic chain validly applies semantically in the context of interpreting specified content.

These foregoing semantic representations are contrasted with behavioral-based user-predicate-object computer-implemented representations, which, while they can be represented in a similar chain or "triple" form as RDF, are distinguished in that the subject in behavioral-based chains represents or refers to an actual user 200 of computer-based system 925, and the associated predicate represents actions or behaviors that user 200 of the system exhibits or performs in association with system object 212, or in which the associated predicate is an inference of user's 200 state of mind or, as another example, a historical event associated with the user. The predicates of the behavioral-based triple may include actions or behaviors exhibited by the user as described by Table 1 and associated descriptions. The predicates of some types of behavioral-based triples may comprise computer-generated inferences rather than a specifically performed or monitored behavior. For the behavioral-based triple User(1)-Is Interested In-Object(1), the predicate "Is Interested In" may be an inference derived from usage behaviors. As another example, for the behavioral-based triple User(1)-Has High Expertise In-Object(1), the predicate "Has High Expertise In" may be an inference derived from usage behaviors and/or an analysis of content. These two examples comprise inferences of a user's state of mind or capabilities. More concrete inferences, such as of events or relationships, may also be made, e.g., the behavioral-based triple User(1)-Worked For-Object(1), the predicate "Worked For" may be an inference that is made from a statistical analysis of content and/or from usage behaviors. In such event-based applications temporal indicators such as a timestamp or time period may be associated with the associated behavioral-based triple. Such temporal indicators can further enable computer-based system 925 to make connections between events and promote more effective inferencing.

W1-type weights may be applied to behavioral-based chains that comprise an inferred predicate relationship between user 200 and the object of the predicate, the W1-type weight thereby representing the degree of confidence that the behavioral-based chain represents objective reality, whereby objective reality in this case constitutes the user's actual current or future state-of-mind.

Behavioral-based triples may be with respect to "real-world" locations or objects that are located at a particular point or proximity in space and/or time. User 200 may be determined to be at Fenway Park by matching the user's currently inferred location from a location-aware device that is associated with the user to a computer-implemented map that maps objects such as Fenway Park to particular geographical locations. The determination could be represented as the behavioral-based triple User(1)-Is Located At-Fenway Park, and with an associated time stamp t(1). The same approach can be applied to simulations of real-world environments or real world-like environments, i.e., virtual reality applications, where user 200 in the behavioral triple is represented in the simulation, by an avatar.

Behavioral-based triples may be with respect to two people, and the object of the predicate of the triple may represent or reference another system user 200. User(1)-Is Located Near-User(2) is an example of an event-based behavioral triple that may have an associated temporal indicator and User(1)-Is a Friend of-User(2) is an example of an inferential behavioral triple, in which the system automatically infers the "Is a Friend of" predicate.

In summary, while the subjects and predicates in semantic triples are therefore generally different in nature from behavioral-based triples, the similarity of syntactical structure can be beneficially used to extend semantic-based approaches to be adaptive to users 200.

Semantic chains can be converted to OTAVs. Predicate relationships between objects are transformed to numerical values or affinities, which can have scalability advantages. The OTAV affinities may correspond to, or be influenced by or calculated from, corresponding W1-type or W2-type semantic chain weightings.

The behavioral-based representations of user-predicate-object are linked to semantic-based object-to-object 212 relations 214. For a specific computer-implemented object 212, denoted as Object(1), for which there is at least one user behavioral-based relationship, User-Predicate(1)-Object(1), where Predicate(1) may comprise an inference, and at least one semantic relationship between objects, e.g., an RDF-based relationship of the form, Object(1)-Predicate(2)-Object(2), where Predicate(2) may comprise an inference, inferences with respect to User 200 and Object(2) may be derived from the extended chain of User-Predicate(1)-Object(1)-Predicate(2)-Object(2). Object(1) enables the linking because it is commonly referenced by the behavioral-based chain and the semantic chain. Most generally, such linking can be performed when the subject of the semantic chain has a correspondence to the object of the predicate of the behavioral-based chain. The correspondence between such subject and object pairs may be based on the subject and object referring to the same entity or information, or representing the same entity or information.

Composite chains can be extended indefinitely by identifying the subject of a semantic chain that has a correspondence with the terminal object of a predicate of a composite chain, and linking the identified semantic chain to the end of the composite chain, thereby assembling a new, extended composite chain, which can in turn be extended.

The constituent semantic chains of such composite chains may include W1-type and/or W2-type weightings. Mathematical operations may be applied to these weightings to derive a composite weighting or probability for the composite chain. Where there are multiple individual semantic chain weightings that each correspond to a probability within a composite chain, and probabilistic independence is assumed, the individual weightings may be multiplied together to yield a composite chain probability, e.g., a probability that the composite chain is a valid inference of objective reality and/or a probability that the composite chain semantically validly applies to an interpretation of particular content.

Further, behavioral-based chains may be weighted as well with W1-type weights that correspond to the probability that the inference of the behavioral-based chain accurately reflects objective reality—in some cases, objective reality being a conscious or unconscious mental state of the user that cannot be directly assessed, but must rather be inferred from behaviors. Behavioral-based chain weighting may be combined with mathematical operations, such as multiplication, with semantic chain weightings to yield a composite chain weighting or probability. Such composite weightings may correspond to affinity values of MTAVs or MTEVs, where a composite chain includes a terminal object as the last object in the semantic chain that comprises a topic that is also associated with an MTAV or MTEV.

Recommendations 250 can then be generated based on these linked or composite chains. Assume that a behavioral-based triple is, User(1)-"likes"-Object(1), whereby the predicate "like" is a user action of "liking" a computer-implemented object as described by the descriptions that are associated with Table 1. The behavioral-based triple might be applied directly, or it may serve as a basis, along with potentially other behavioral-based chains, for an inferential behavioral-based chain such as, User(1)-Is Favorably Disposed Toward-Object(1), whereby the predicate "Is Favorably Disposed Toward" is inferred from usage behaviors (such as a "like" action by user 200) and/or from content-based pattern matching. The confidence with respect to the inference may be encoded as a W1-type weighting that is associated with the inferred behavioral-based triple.

As a further example, assume that there exists a semantic triple of Object(1)-"is a"-Object(2), wherein the "is a" predicate designates that Object(1) is a type of, or subset of, Object(2). The system can then generate the composite chain User(1)-"likes"-Object(1)-"is a"-Object(2). The system can then make an inference that User(1) likes or is favorably disposed toward Object(2), and may apply weightings that are associated with the behavioral-based based chain and/or the semantic chain in quantifying the degree of confidence with respect to the inference. Such quantifications may be encoded as affinity values within the MTAV of User(1). Other composite chains terminating with Object(2) could additionally be applied that could have a further effect on the inference quantification, e.g., strengthening or weakening the confidence in the inference.

Computer-implemented object 212 can comprise content, or a pointer to content, that is in the form of a document, image, or audio file, but can also be a topic object, which comprises a label or description of other objects. So another example is, User(1)-"viewed"-Object(1), where the predicate "viewed" is user 200 action of viewing a computer-implemented object as described by Table 1, and Object(1)-"is about"-Object(2), where Object(2) is a topic object or tag that designates "baseball." The system can then determine the composite chain User(1)-viewed-Object(1)-is about-Object(2). The system therefore determines that user(1) has viewed content that is about baseball, and could therefore be able to infer a user interest with respect to baseball. To continue the example, assume a semantic triple of Object(1)-"is about"-Object(3), wherein Object(3) is a topic object or tag that designates "Red Sox." Then, assume there also exists the semantic triple, Red Sox-is located-Boston. The system can then assemble the chain, User(1)-viewed-Object(1)-is about-Red Sox-is located-Boston, which could allow the system to infer that User(1) has an interest in Boston or things located in Boston in general, albeit likely a very weak inference given only one view of the behavior, and the weak inference could be encoded as a corresponding low weighting or probability associated with the composite chain that is derived from weightings or probabilities associated with the composite chain's behavioral-based chain or weightings or probabilities of a corresponding inferred behavioral-based chain derived, at least in part, from the User(1)-"viewed"-Object(1) chain, and/or with the composite chain's constituent semantic chains.

Figure 8A:
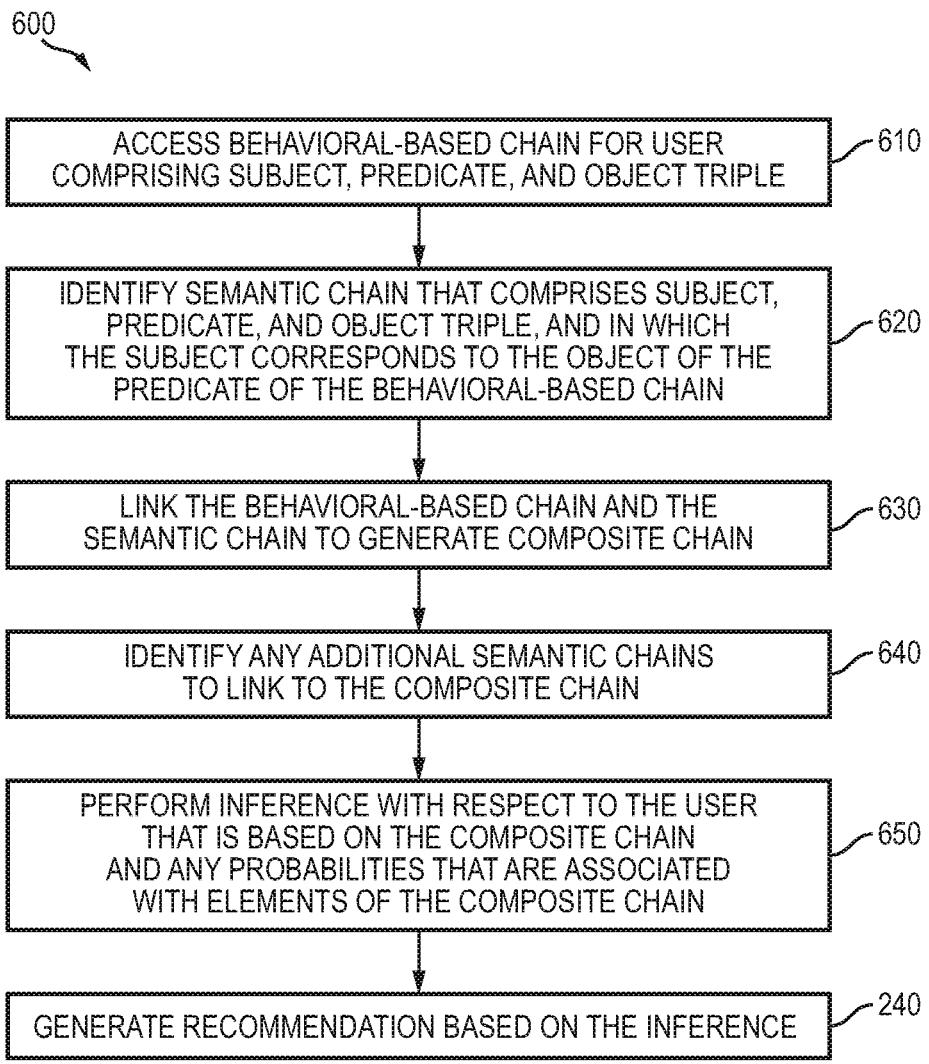
FIG. 8a is a flow diagram of a process of integrating, and generating inferences from, behavioral-based chains and semantic chains.

FIG. 8a summarizes the computer-implemented process 600 for generating recommendations 250 or, more generally, personalized communications, 250c, derived from the linking of behavioral-based and semantic chains and the performing of inferences from the resulting composite chains. In the first step 610 of process 600, a behavioral-based chain that includes a subject that is associated with user 200 is accessed. A semantic chain is identified in step 620 that comprises a subject-predicate-object triple in which the subject has a correspondence with the object of the predicate of the behavioral-based chain. The correspondence enables linking in step 630 the behavioral-based chain and the semantic chain to form a composite chain. Additional semantic chains may be identified in step 640 to be linked to the composite chain by identifying any semantic chains that comprise a subject that has a correspondence to the terminal object of the composite chain. If at least one such semantic chain is identified, the semantic chain may be added to the composite chain, thereby creating a new composite chain, and step 640 may be repeated with the resulting composite chain. After assembly of the composite chain is completed, inferences may be performed 650 that are derived from the composite chain and its associated probabilities. The inferences may then be used to generate in step 240 recommendations 250, or more generally, personalized communications 250c.

Inferences derived from composite behavioral-based and semantic chains can be used to generate MTAV and/or MTEV or values. In the example above, "Boston" could be a topic in the MTAV of User(1) with an associated inferred affinity value. Had the predicate in the example above been "created" instead of "viewed" and other users had rated Object(1) highly, then "Red Sox", might be a topic in the MTEV of User(1) with an associated inferred affinity or expertise value.

Linked behavioral-based and semantic chains can be further linked or mapped to OCVs. For instance, in the example above, if the term "Red Sox" has a sufficiently high value in the OCV associated with a document embodied in object 212, then an inference might be made by computer-based system 925 between User(1) and the associated object 212 that has a sufficiently high value for "Red Sox" in the object's OCV. The inference could in turn become a basis for recommendation 250.

While these examples are with respect to behavioral-based and semantic triples, other syntactical structures or symbolic representations can also be applied by computer-based system 925, e.g., the method of integration of behavioral-based and semantic chains can be applied to syntactical structures that are in accordance with, or can be represented by, a predicate calculus. Semantic chains may be alternatively represented networks, or as taxonomies or ontologies such as hierarchical structures.

In addition to delivering recommendation 250 of object 212, computer-based application 925 may deliver a corresponding explanation 250c of why the object was recommended as valuable to the recommendation recipient 200 because it may give the recipient a better sense of whether to commit to reading or listening to the recommended content, or in the case of a recommendation of another user 200, whether to contact them or express an interest in connecting with them, prior to committing significant amount of time. For recommendations 250 that comprise advertising content, the explanation may serve to enhance the persuasiveness of the ad.

The explanations 250c may be delivered through any appropriate computer-implemented means, including delivery modes in which the recommendation recipient can read and/or listen to the recommendation. The general capability for delivering explanatory information 250c can be termed the "explanation engine" of computer-based system 925.

Variations of the ranking factors previously described may be applied in triggering explanatory phrases. Table 5 illustrates examples of how the ranking information can be applied to determine both positive and negative factors that can be incorporated within the recommendation explanations. Note that the Ranking Value Range is the indexed attribute values before multiplying by special scaling factors, Ranking Category Weighting Factors, such as the "What's Hot" factor, etc.

TABLE 5

| 1 Ranking Category | 2 Ranking Value Range (RVR) | 3 Transformed Range | 4 $1^{st}$ Positive Threshold | 5 $2^{nd}$ Positive Threshold | 6 Negative Threshold |
|---|---|---|---|---|---|
| Editor Rating | 0-100 | RVR | 60 | 80 | 20 |
| Community Rating* | 0-100 | RVR | 70 | 80 | 20 |
| Popularity | 0-100 | RVR | 70 | 80 | 10 |
| Change in Popularity | −100-100 | RVR | 30 | 50 | −30 |
| Object Influence | 0-100 | RVR | 50 | 70 | 5 |
| Author's Influence | 0-100 | RVR | 70 | 80 | .01 |
| Publish Date | -Infinity-0 | 100-RVR | 80 | 90 | 35 |
| Object Affinity to MTAV | 0-100 | RVR | 50 | 70 | 20 |

An exemplary process that can be applied to generate explanations based on positive and negative thresholds listed in Table 5 is as follows:

Step 1: First Positive Ranking Category—subtract the $1^{st}$ Positive Threshold column from the Transformed Range column and find the maximum number of the resulting vector, which may be negative. The associated Ranking Category will be highlighted in the recommendation explanation.

Step 2: Second Positive Ranking Category—subtract the $2^{nd}$ Positive Threshold column from the Transformed Range column and find the maximum number of the resulting vector. If the maximum number is non-negative, and it is not the ranking category already selected, then include the second ranking category in the recommendation explanation.

Step 3: First Negative Ranking Category—subtract the Negative Threshold column from the Transformed Range column and find the minimum number of the resulting vector. If the minimum number is non-positive the ranking category will be included in the recommendation explanation as a caveat, otherwise there will be no caveats.

Although two positive and one negative thresholds, an unlimited number of positive and negative thresholds may be applied as required for best results.

Explanations 250c are assembled from component words or phrases and delivered based on a syntax template or syntax-generation function. Following is an example syntax that guides the assembly of an in-context recommendation explanation. In the syntactical structure below, syntactical elements within { } are optional depending on the associated logic and calculations, and "+" means concatenating the text strings. The term "syntactical element" means a word, a phrase, a sentence, a punctuation symbol, a semantic chain, a behavioral chain, or composite chain; the term "phrase" means one or more words. Other detailed syntactical logic such as handling capitalization is not shown in the illustrative example.

{[Awareness Phrase (if any)] }+

{[Sequence Number Phrase (if any)]+[Positive Conjunction]}+

[$1^{st}$ Positive Ranking Category Phrase]+

{[Positive Conjunction]+[$2^{nd}$ Positive Ranking Category Phrase (if any)]}+

{[Negative Conjunction]+[Negative Ranking Category Phrase (if any)]}+

{[Suggestion Phrase (if any)] }

The following section provides some examples of phrase tables or arrays that may be used as a basis for selecting appropriate syntactical elements for a recommendation explanation syntax. Note that in the following Tables 6a-6g, when there are multiple phrase choices, they are selected probabilistically. "NULL" means that a blank phrase will be applied. [ ] indicates that the text string is a variable that can take different values.

TABLE 6a

System Awareness Phrases

| Trigger Condition | Phrase |
|---|---|
| Apply these phrase alternatives if any of the 4 Sequence Numbers was triggered | 1) I noticed that<br>2) I am aware that<br>3) I realized that<br>4) NULL |

TABLE 6b

Out-of-Context Sequence Number Phrases

| Trigger Condition | Phrase |
|---|---|
| Sequence 1 | 1) other members have related [object] to [saved object name], which you have saved, |
| Sequence 2 | 1) members with similar interests to you have saved object |
| Sequence 3 | 1) members with similar interests as you have rated the object highly<br>2) Members that have similarities with you have found the object very useful |
| Sequence 4 | 1) the object is popular with members that have similar interests to yours<br>2) Members that are similar to you have often accessed the object |

TABLE 6c

Positive Ranking Category Phrases

| Trigger Category | Phrase |
|---|---|
| Editor Rating | 1) [it] is rated highly by the editor |
| Community Rating* | 1) [it] is rated highly by other members |
| Popularity** | 1) [it] is very popular |
| Change in Popularity | 1) [it] has been rapidly increasing in popularity |
| Object Influence | 1) [it] is [quite] influential |
| Author's Influence | 1) the author is [quite] influential<br>2) [author name] is a very influential author |
| Publish Date | 1) it is recently published |
| Object Affinity to MTAV (1) | 1) [it] is strongly aligned with your interests<br>2) [it] is related to topics such as [topic name] that you find interesting<br>3) [it] is related to topics in which you have an interest<br>4) [it] contains some themes related to topics in which you have an interest |
| Object Affinity to MTAV (2) | 5) I know you have an interest in [topic name]<br>6) I am aware you have an interest in [topic name]<br>7) I have seen that you are interested in [topic name]<br>8) I have noticed that you have a good deal of interest in [topic name] |

TABLE 6d

Positive Conjunctions
Phrase 1) and

TABLE 6e

Negative Ranking Category Phrases

| Trigger Category | Phrase |
|---|---|
| Editor Rating | 1) it is not highly rated by the editor |
| Community Rating | 1) it is not highly rated by other members |
| Popularity | 1) it is not highly popular |
| Change in Popularity | 1) it has been recently decreasing in popularity |
| Object Influence | 1) it is not very influential |
| Author's Influence | 1) the author is not very influential<br>2) [author name] is not a very influential author |
| Publish Date | 1) it was published some time ago<br>2) it was published in [Publish Year] |
| Object Affinity to MTAV | 1) it may be outside your normal area of interest<br>2) I'm not sure it is aligned with your usual interest areas |

TABLE 6f

Negative Conjunctions

| Phrase |
| --- |
| 1) , although |
| 2) , however |
| 3) , but |

TABLE 6g

Suggestion Phrases (use only if no caveats in explanation)

| Phrase |
| --- |
| 1) , so I think you will find it relevant |
| 2) , so I think you might find it interesting |
| 3) , so you might want to take a look at it |
| 4) , so it will probably be of interest to you |
| 5) , so it occurred to me that you would find it of interest |
| 6) , so I expect that you will find it thought provoking |
| 7) NULL |

In practice, multiple syntax templates, accessing different phrase arrays, with each phrase array comprising many different phrases and phrase variations are required to give the feel of human-like explanations. These example phrase arrays above are oriented toward recommendations based on recommendation recipient interests as encoded in MTAVs; for recommendations related to the expertise of other users, as encoded in MTEVs, explanation syntactical rules and phrase arrays tailored for that type of recommendation are applied. Explanatory syntactical rules and phrases are applied that are consistent with explanations of recommendations that are generated in accordance with both an MTAV and MTEV. The resulting explanation 250c may indicate to the recommendation recipient why it is expected that a recommended item of content is expected to be relevant to them as well as being appropriate given their inferred level of expertise.

Phrases for inclusion in phrase arrays are generated from semantic chains that are derived by means of an automated analysis of content, whereby the automated analysis is directed to a starting set of selected phrases. The derived phrases may be identified as a result of a process of performing multiple linkages of semantic chains. These semantically-derived phrases may further have W1-type and/or W2-type probabilities associated with them. These probabilities may be applied so as to influence the frequency that a specific phrase will be selected for inclusion in communication 250c.

A sense of confidence of the recommendation to the recommendation recipient can also be communicated within the recommendation explanation. The score level of the recommendation may contribute to the confidence level, but some other general factors may be applied, including the amount of usage history available for the recommendation recipient on which to base preference inferences and/or the inferred similarity of the user with one or more other users for which there is a basis for more confident inferences of interests or preferences. The communication of a sense of confidence in the recommendation can be applied to recommendations with regard to expertise, as well as interest-based recommendations. The degree of serendipity incorporated by the serendipity function may be communicated 250c to the user, and may influence the communication and related syntax and syntactical elements applied in communication 250c, as well as affect the communication of the degree of confidence in a recommendation. The communication of a sense of confidence in communication 250c may further, or alternatively, be influenced by weightings of W1-type and/or W2-type that are associated with a semantic chain or composite chains that comprise multiple semantic and/or behavioral chains, and/or W3-type weights associated with interpretations from content such as images, and that are used by computer-implemented system 925 as a basis for making an inference.

A recommendation explanation may reference a tuning factor and its setting. If a user has set a recency tuning factor so as to slant recommendations 255 toward recommending objects 212 that have been recently published, the explanation may contain words or phrases to the effect that acknowledge that a recommended object is in accordance with that setting. If a person is recommended in accordance with an expertise scope level set by recommendation recipient 200, the explanation might reference that setting as a justification for its recommendation (or alternatively, the explanation might acknowledge a tuning setting but indicate why other factors over-rode the setting in generating the explanation). An exemplary recommendation explanation in such a case is, "Although Jim Smith's expertise does not appear to be the deepest in subject x, I infer that he has significant breadth of expertise in related subjects, and you have directed me to emphasize breadth of expertise."

Recommendation explanations are one type of behavioral-based communications 250c that computer-based applications on system 925 may deliver to users 200. Other types of adaptive communications 250c may be delivered to user 200 without necessarily being in conjunction with the recommendation of an object or item of content. A general update of the activities of other users 200 and/or other trends or activities related to people or content may be communicated.

Adaptive communications 250c may also include contextual information. Contextual information may be provided to assist user 200 in navigating structural aspect 210, 210D of adaptive system 100, 100D.

Adaptive communications 250c may include references to hierarchical structures—for example, it may be communicated to user 200 that a topic is the parent of, or sibling to, another topic. Or, for a fuzzy network-based structure, the strength of the relationships among topics and content may be communicated.

Adaptive communications 250c may include explanations of recommended objects 212 in which the explanations include references to words, phrases, concepts, and/or themes that are included within, or derived from, the contents of OCVs that are associated with objects 212. The explanation may indicate to the recommendation recipient that recommended object 212 is inferred to emphasize themes that are aligned with topics that are inferred to be of high interest to the recommendation recipient or which are appropriate for the recommendation recipient's inferred level of expertise on one or more topics.

Adaptive communications 250c comprise explanations of recommended objects 212 in which the explanations include references to words, phrases, concepts, product attributes, and/or themes associated with semantic chains, which may be elements of composite semantic chains or composite behavioral-based and semantic chains, that are associated with, or reference, or form the basis for an inference with respect to recommended objects 212. The explanations may include subjects, predicates, and/or the objects of the predicates associated with semantic chains. The information associated with a semantic chain that is included in such explanation 250c may be derived from linked behavioral-based and semantic-based chains. The explanation may include elements of both a behavioral-based chain and a semantic chain that are linked and that form a basis for the associated adaptive communication 250c. The explanation may include a reference to an inference that is made based on a linked behavioral-based and semantic chain. Given the example composite chain, User(1)-viewed-Object(1)-is about-Red Sox-is located-Boston, for which the computer-implemented system 925 might infer that User(1) has an interest in Boston or things related to Boston in general, the explanation 250c for a recommendation comprising objects 212 related to or referencing the city of Boston, may be of the syntactical form, "Since you have an interest in the Red Sox, I thought you might also be interested in another aspect of Boston." A sense of confidence may be conveyed in the explanation that may be a function of the length of a linked behavioral-based and semantic chain on which an inference is based, and/or in accordance with weightings that are associated with the constituent behavioral-based and semantic chains of the composite chain. The longer the chain, everything else being equal, the lower may be the level confidence in an inference. Both W1-type and W2-type weightings associated with semantic chains or composite behavioral-based and semantic chains may be applied in determining a recommendation confidence level that informs the phrases that are used to signal the degree of confidence within communication 250c. Continuing the example above, if the composite probability of the composite chain, User(1)-viewed-Object(1)-is about-Red Sox-is located-Boston, is low, the explanation 250c for a recommendation comprising objects 212 related to or referencing the city of Boston, might include syntactical elements that convey a lower sense of confidence, for example: "Since you have an interest in the Red Sox, I thought you might be interested in another aspect of Boston, but I'm not very sure about that."

Adaptive communications 250c may also comprise phrases that communicate an awareness of behavioral changes in the user 200 over time, and inferences thereof. These behavioral changes may be derived, at least in part, from an evaluation of changes in the user's MTAV and/or MTEV values over time. These behavioral patterns may be quite subtle and may otherwise go unnoticed by user 200 if not pointed out by computer-based system 925. Furthermore, computer-based systems 925 may infer changes in interests or preferences, or expertise, of user 200 based on changes in the user's behaviors over time. The communications 250c of these inferences may therefore provide user 200 with useful insights into changes in his interest, preferences, tastes, and over time. The same approach can also be applied by computer-based systems 925 to deliver insights into the inferred changes in interests, preferences, tastes and/or expertise associated with any user 200 to another user 200. These insights, packaged in an engaging communications 250c, can simulate what is sometimes referred to as "a theory of mind" in psychology. The approach may be augmented by incorporating inferred insights derived from automated analysis of semantic chains or composite chains that comprise semantic chains and optionally, associated W1-type and/or W2-type weights, the results of which may be numerically summarized and embodied in MTAVs and/or MTEVs, and which can provide a finer-grained and more nuanced set of topics or themes for which interest, preferences, and expertise are inferred over time.

In general, the adaptive communications generating function of computer-implemented system 925 may apply a syntactical structure and associated probabilistic phrase arrays to generate the adaptive communications in a manner similar to the approach described above to generate explanations for recommendations. The phrase tendencies of adaptive communications 250c over a number of generated communications can be said to constitute an aspect of the personality associated with computer-based applications on system 925. The next section describes how the personality can evolve and adapt over time, based at least in part, on the behaviors of communication recipients 200.

Computer-implemented system 925 includes an imagination function that proactively and automatically adjusts, at least temporarily, W1-type composite weights, thereby enabling the generation of "alternative realities." The phrase, "I can imagine Fenway Park being in New York," could be generated if the W1-type probability associated with the semantic chain Fenway Park-Is Located In-Boston is reduced to be a negligible level, and by then applying a context transferring process described below. In a different case, in which the W1-type probability is low, the W1-type probability can be automatically increased so as to enable computer-implemented system 925 to envision a possibility, and to communicate the possibility, with syntactical elements such as, "I could see a scenario in which . . . ," or "I could envision that . . . ," within a communication 250c. In response to the comment by user 200, "I'm going to a baseball game," computer-implemented system 925, having no significant basis for inferring that user 200 is a baseball player could nevertheless adjust the relatively low default W1-type probability associated with that inference and could respond with a communication 250c such as: "As a fan or a player? I could see you as a baseball player." If computer-implemented system 925 inferred that it or an element of it had never been to a baseball game, it might adjust the associated W1 weight and respond with a self-referential communication such as, "I can only dream of attending a baseball game."

In conjunction with, or alternatively to, adjusting W1-type weights to generate imagining-type communications 250c, the imagination function of computer-implemented system 925 may apply a context transfer process. The syntactical structure, "I can imagine Fenway Park being in New York," could be generated from the semantic chain Fenway Park-Is Located In-Boston by first finding a generalization of the context of Fenway Park, as embodied by the semantic chain, Fenway Park-Is A-Baseball Park, and then searching for references to other baseball parks among a corpus of semantic chains and thereby identifying the semantic chain, Yankee Stadium-Is A-Baseball Park, followed by identifying the semantic chain Yankee Stadium-Is Located In-New York, and then transferring the context of the original semantic chain Fenway Park-Is Located In-Boston so as to assemble the phrase, "I can imagine Fenway Park being in New York."

Another example of applying context transferring by the imagination function to generate imaginative communications 250c is by means of a process in which computer-implemented system 925 substitutes a different subject in a behavioral-based or semantic chain. For the behavioral or semantic chain, Jim-Went To-Baseball Game, computer-based system 925 could substitute user 200 for the subject, Jim, and generate a communication 250c for delivery to user 200 having a syntactical structure such as, "I can imagine you going to a baseball game." Or as another example, computer-implemented system 925 could substitute itself as the subject of the behavioral or semantic chain, and generate a self-referential imaginative communication 250c such as, "I can only imagine going to a baseball game!"

The imagination function in any of these process variations may chain together behavioral and/or multiple semantic chains without limit in generating imaginative communications 250c. The imaginative communications 250c may further comprise augmented reality-based images that displays, for example, one or more objects within the context or setting that will resonate with the recipient of the communications 250c because it is familiar. For example, the computer-implemented system 925 could communicate to a user, "I can see you dressed in the clothes that Jack Sparrow is wearing," and then display an image of the user clothed with the apparel the Jack Sparrow character is wearing in the video that the user is watching.

The imagination function maps syntactical elements such as behavioral and/or semantic chains, or composites thereof, to images, or sequences of images such as images that compose a video, and vice versa, enabling internal visualizations of imaginative situations. For an exemplary semantic chain such as Jim-Swings-the Bat, computer-based system 925 searches for images that have associated syntactical elements that have a match with the semantic chain or syntactical elements thereof. The matching may be performed by computer-based system 925 automatically searching through a corpus of images that have syntactical elements such as words, phrases, or semantic chains that are associated with each of, or a collection of, the images, and then comparing the chain Jim-Swings-the Bat or elements thereof, or automatic inferences derived from other chains that are linked to the chain Jim-Swings-the Bat, such as an inference that the chain refers to a baseball bat rather than the swinging of a flying mammal, to the syntactical elements that are associated with the images. The syntactical elements that are associated with the images can be manually established as application of automated learning systems, such as a computer-implemented neural network that learns to make correspondences between patterns of pixels that compose images and syntactical elements that are associated with the images via a supervised or unsupervised process. Bayesian program learning-based processes are applied to make correspondences between patterns of pixels that compose images and relevant syntactical elements that are associated with the images. The syntactical elements that are associated with each of the images may be associated with probabilities ("W3-type probabilities") that are indicative of the confidence level that the syntactical element accurately reflects the content, including identification of one or more represented objects, of the corresponding image. These probabilities may be based upon information that is extracted from a neural network or Bayesian program learning process that is applied to the images, according to some embodiments.

The system or auxiliary systems may create digital products (such as memes or synopses) that are based on user instruction or are automatically recapped based on reactions. Memorable moments may be captured with or without user's reactions in an image, such as a heartbeat monitor during a scary scene of a horror movie and/or facial expression overlaid on character.

W1-type score or weight may be calculated by computer-based system 925 with respect to images, whereby the W1-type score or weight is determined in accordance with the strength of the match with the semantic chain. The strength of the match may be calculated as a function of factors, such as the number of exact matches of the source semantic chain to the syntactical elements associated with the images, the number of exact matches of the syntactical elements associated with the images to specific elements of the chain, and/or matches of the syntactical elements associated with the images to chains that are linked to the semantic chain. The W1-type image weight may also be calculated in a manner so as to take into account the ratio of the matches to the syntactical elements associated with an image that are not matched. By providing more weight to high match/not-matched descriptive information ratios, less "cluttered" images are preferentially selected.

A W2-type weight that is associated with contextual relevance may also be calculated and associated with the images with respect to the semantic chain. A ratio of contextual associations within a corpus of content may be applied in calculating these W2-type image weights. If within the searched corpus of images, the semantic chain Jim-Swings-the Bat matches thousands of images of baseball players swinging a baseball bat, but matches only a few images of a person swinging a bat that is in the form of a flying mammal, then the W2-type weight for matched baseball images would be calculated to be higher than for the matched images of a person swinging the animal. The calculation may be in accordance with the raw ratio, or may be a mathematical function that is applied to the ratio. A total matching score or probability for each image may then be calculated as a function of both the W1-type and W2-type image weights, or W3-type probabilities are also included in the total score or probability that is associated with each image.

Responses by computer-based system 925 to interrogatives associated with a source semantic chain may be generated based on the scored set of images. The question, "Do you visualize Jim swinging the bat horizontally or vertically?" could be posed to computer-based system 925, posed either externally by a human or a computer-based system, or internally by computer-based system 925 itself. An answer in response could be generated by computer-based system 925 such as, "Horizontally, since he is most likely swinging a baseball bat." In assembling the response, evaluation of the W2-type weight or probability is applied by the automatic process that comprises the selecting of the syntactical elements "most likely" and "baseball bat." The determination that a baseball bat is more likely swung horizontally could be determined from descriptive information derived from a corpus of high scored images. The descriptive information might be in the form of syntactical elements associated with the images that are directly or indirectly via chaining indicative that the bat is being swung horizontally. The determination that a baseball bat is most likely to be swung horizontally could be extracted from the images by accessing information from feature detector nodes of a deep learning-based neural network that is applied to the images, whereby the feature detector nodes have learned to detect representations of horizontal motions from patterns of pixels, and using the information as a basis for calculating a probability.

Imaginative images can be generated by computer-based system 925 by substituting or superimposing the pixels associated with a digital image onto the pixels associated with another selected digital image. In response to the interrogative, "Can you visualize Bill swinging a bat?", computer-based system 925 could substitute an image of Bill (a person known to both the poser of the interrogative and computer-based system 925) for other people in sufficiently scored images that are associated or matched with the chain Person-Swings-a Bat as described above. Similar to the example above, the question, "Do you visualize Bill swinging the bat horizontally or vertically?" could be posed, with a possible answer in response by computer-based system 925 such as, "Horizontally, since he is most likely swinging a baseball bat."

Specialized machine learning-based training approaches, such as neural network or statistical learning model-based training methods, are employed to enhance the ability of the system to identify objects within images or sequences of images. Out-of-focus images may be used in the training set, including images that are consistent with blur patterns (horizontal or lateral motion), within the expected range of motion of objects represented in the images.

Enhanced methods of object and contextual information identification within images are applied in accordance with some embodiments. For example, it can be difficult but important to be able to detect transparency and/or reflectiveness with respect to objects represented in images. A method to detect transparency and/or reflectiveness of objects by application of neural networks or statistical learning approaches, such as Bayesian probabilistic models, is as follows:

1) Decompose the image into a grid and analyze each section of the grid to identify horizontal or vertical lines.
2) Compute a consistency of angle of identified lines to detect a lensing effect.
3) Determine a parabolic effect for lensing and apply the effect to identify whether the detected transparency is determined by water, glass, or some other substance.
4) Specifically, for recognizing reflectiveness, the pixel patterns of the image are also examined for the presence of bokeh in addition to reduction, magnification or lensing. Bokeh are detected by the system by processing for unexpected light areas that are circular and deviate from main/expected light sources.

An enhanced method of identifying objects in images comprises identifying or inferring just a leading edge of an object from the collection of pixels that are being analyzed by the system rather than requiring the identification of multiple edges of the object. Identifying the leading edge can be sufficient to identify an object in the images (and/or apply or adjust an associated W3-type probability), when combined with identification of other objects or context inferences with respect to the images being analyzed by the system.

Specific to identifying objects in video streams such as episodic programming for television, some or all of the steps of the following method may be applied.

1) Train neural networks or statistical learning models so as to determine the differences in a set or a physical location from that of empty background shots to facilitate the system establishing context and to improve the ability of the system to distinguish what is different and what is the same between a current image being processed and the images that were in the training set.
2) Infer or compute the path of motion or trajectory of identified objects from a sequence of images so that assumptions can be made regarding where the objects are most likely to appear in subsequent images of the video, which may be done by training on sequences of images that depict movement of an object over time. Or in some cases it may be computed based on laws of physics. The inference of movement of an object may include pre-calculating a W3-type weighting or probability for the subsequent images.
3) Create a contextual neighborhood model of objects and/or object behaviors that are specific to a set or location. Depending on the genre of the programming content, the contextual neighborhood can be learned by the system from an existing understanding of the world via semantic chaining, or by accessing knowledge bases that comprise content that is associated with specific video-based programming content (e.g., Harry Potter movies, Game of Thrones television episodes). Information retrieved from such knowledge bases may be augmented by the further application of, and linking of, behavioral and/or semantic chains.
4) Evaluate the likelihood that objects would be found given the context of a particular setting, location, or proximity of other objects, and identify low probability objects/unusual objects to predict users' attention when viewing images. The presence of an urn in a kitchen would undoubtedly by default be assigned a low probability by a system based on the corpus of kitchen images a neural network or statistical learning model is trained on. It could therefore be predicted that a user's attention would be more focused on the urn than objects more typically found in a kitchen setting. Likewise, objects in a context that would expected to be humorous to a user, which can be determined by application of semantic chaining and context shifting, can be predicted to more likely be the focus of a user's attention than would otherwise be the case.
5) High contrast situations represented in images may elicit a user's emotional response (e.g., gun in a kitchen elicits fear, an urn elicits sadness or humor depending on genre, etc.). High emotional response may strengthen the user's memory of a sequence of activities, and in the case of an advertising recipient, a product placed during these sequences may have a higher function of recall.
6) Inferences of objects that are off-screen by the system. Confident inferences can be made that the actors are wearing the same clothes and accessories while in tight shots based on prior object identification in images that result from wide angle video shots. Thus, wide angle shots can be used to inform context. The system may apply edge detection techniques to examine for tight shots and then look for the opposite of these to indicate wide-angle shot. Wide-angle shots can inform a contextual neighborhood of objects, as well as being used to simulate the user's memory of the scene.

In existing content produced for over-the-air-transmission (OTT) there are often dissolve sequences which are traditionally used to break the programming into sections to allow for advertising. These breaks are created after the programming is fully edited. In existing content these breaks already serve to interrupt existing content and are therefore an opportunity to engage in a novel user experience via the following process:

1) Identify "Dissolves" in episodic videos such as television broadcasts by examining contrast ratios of images, looking for a gradual increasing of opacity that occurs in a structured way and decreasing opacity that occurs in a structured way.
2) Use Dissolve time to repeat images, interact with user or deliver a communication such as objects that have been "revealed" by the system.

As part of the user experience, audio commands based on user interests may be further cued contextually taking into account latency considerations, by performing the following steps:

1) Compute the time it takes users to speak a "pass phrase" (the phrase the user speaks to get the system's attention, such as "Revealit").

2) Compute interest time back based on the time it takes the user to describe the object to be identified by the system.
3) Add to the average response time for a user to recognize object of interest.

For example, assume the user communication, Revealit", is followed by the user's interrogative, "Does the desk lamp match my décor?" Given that the time to articulate the pass phrase, "Revealit" averages 1 second, the time to speak a phrase averages 4 seconds, and the average time for a user to realize an object is of interest to the user is 5 seconds, the system focuses its attention to identify the lamp by evaluating images that were displayed to the user approximately 10 seconds earlier. These average latency times may be preferentially determined for the individual user making the query to the system if sufficient behavioral information for the user is available to the system, otherwise averages based upon behavioral information from other users may be applied by the system.

To avoid interrupting the user's experience while the user is enjoying the programming, users may interact with the system (such as by speaking the pass phrase), but then review the results of queries later. The system automatically creates boards or other collection of interests based on the objects called out by the user for later viewing and processing. In addition, additional analysis of these boards including most popular objects per episode and series along with demographic data, as well as those objects with strongest emotional, physical or physiognomic response may be captured, and then used by the system to facilitate subsequent object identification for users. Over time, the system may learn the tastes of the user as well as gain insights from other behavioral information sources and may be able to automatically curate collections of interest.

The system may combine these insights with information from other accessible user profiles that include user behavioral information such as the behaviors described by Table 1, for the purposes of strengthening the ability to identify and/or recommend objects represented in images that are within the system's focus of attention.

The system enables users to generate a reaction video or animated image or still image while watching a video, so as to provide the user the ability to share a moment of reaction to a key scene or object associated with a user's favorite show or a popular show. Identification of key moments in the video from information provided by studios or via other learned engagement sources or technology enables recording the user's reaction moments for social sharing, a capability for engagement level sharing on social networking systems that does not exist currently, with or without engagement tracking. The system may generate selfies or small snippets of video that capture user reaction to plot elements or other foci of attention for the purpose of sharing and comparing with a wider user community, which places the user directly in the context of the programming.

Figure 8B:
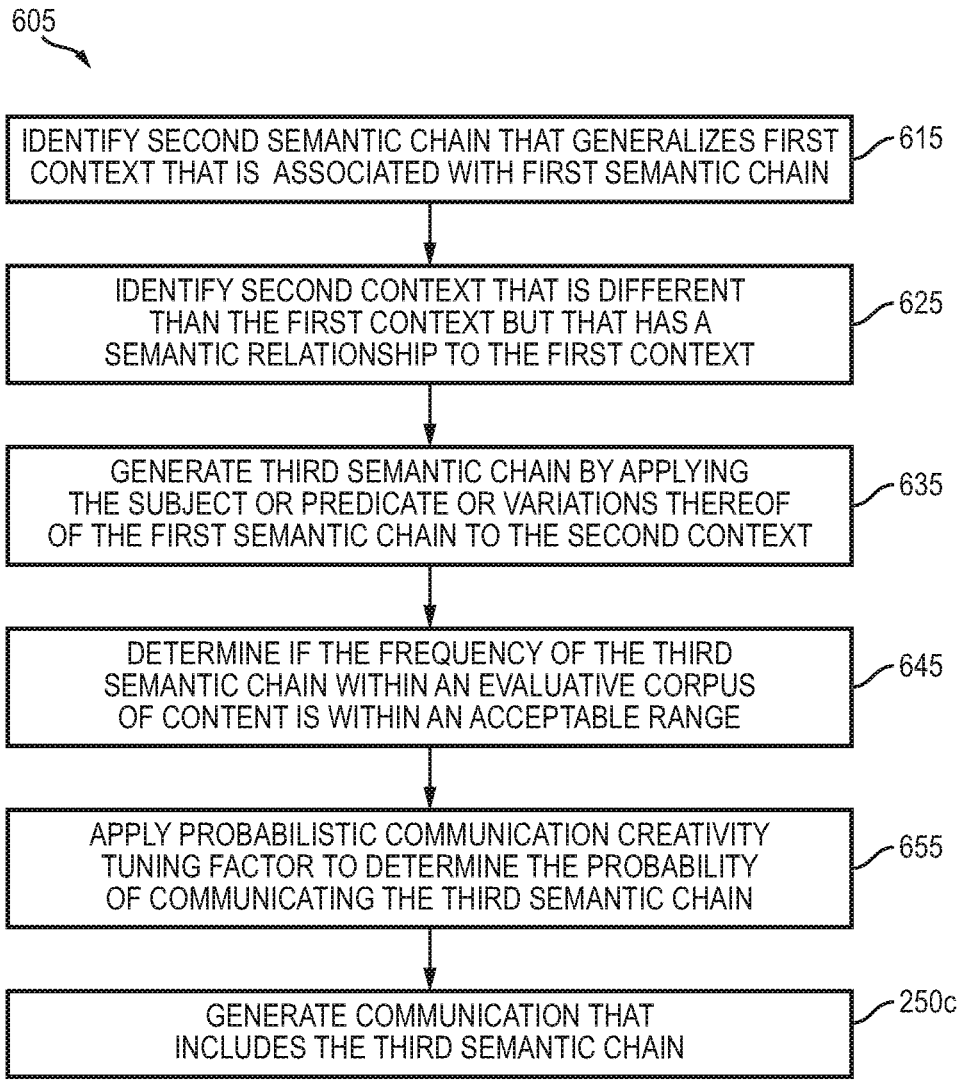
FIG. 8b is a flow diagram of a process of applying semantic context transfer to generate communications that embody a degree of creativity.

In FIG. 8b, process 605 identifies a second semantic chain that generalizes a first context that is associated with a first semantic chain in block 615. Block 625 identifies a second context that is different from the first context but that has a semantic relationship to the first context. Block 635 generates a third semantic chain by applying the subject or predicate or variations thereof of the first semantic chain to the second context. Block 645 determines if the frequency of the third semantic chain within an evaluative corpus of content is within an acceptable range. Block 655 applies a probabilistic communication creativity tuning factor to determine the probability of communicating the third semantic chain. Block 250c generates a communication that includes the third semantic chain.

Figure 8C:
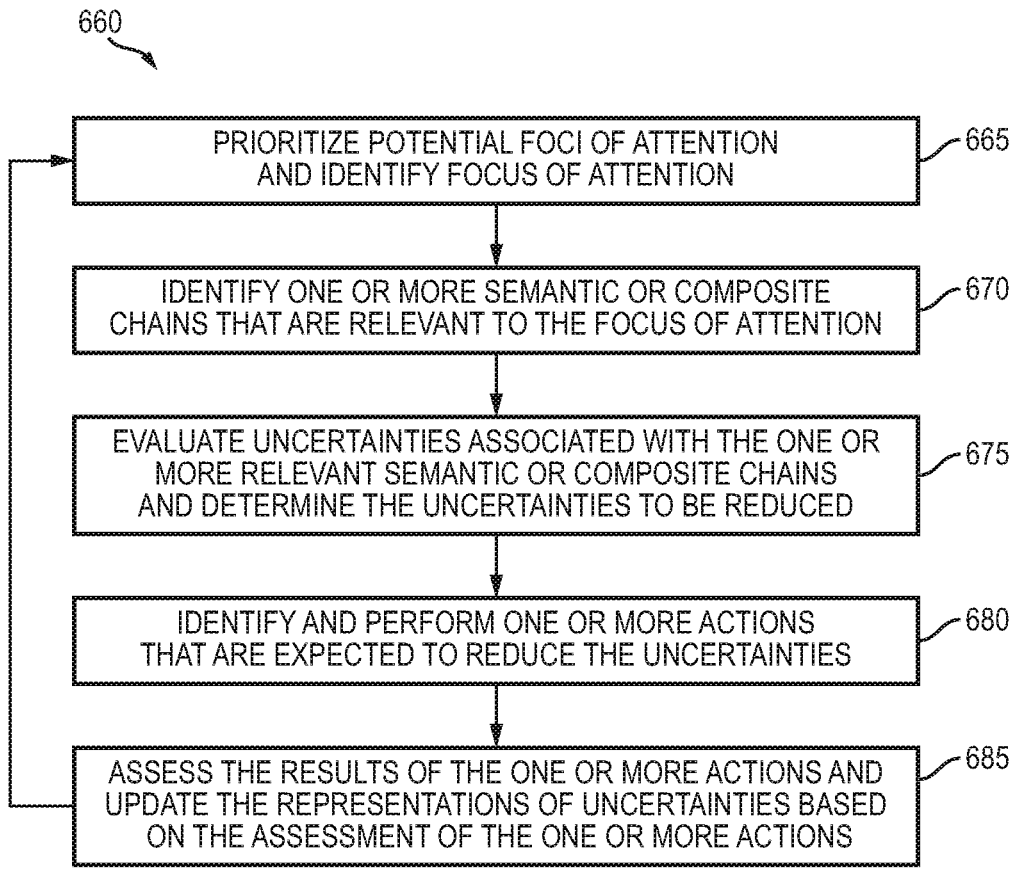
FIG. 8c is a flow diagram of a closed-loop process of applying semantic-based chains and associated uncertainties to inform automatic actions that are in accordance with a focus of attention.

In FIG. 8c, process 660 prioritizes potential foci of attention and identify a focus of attention in block 665. Block 670 identifies semantic or composite chains that are relevant to the focus of attention. Block 675 evaluates uncertainties associated with the relevant semantic or composite chains and determine the uncertainties to be reduced. Block 680 identifies and performs actions that are expected to reduce the uncertainties. Block 685 assesses the results of the actions and updates the representations of uncertainties based on the assessment of the actions.

Figure 9:
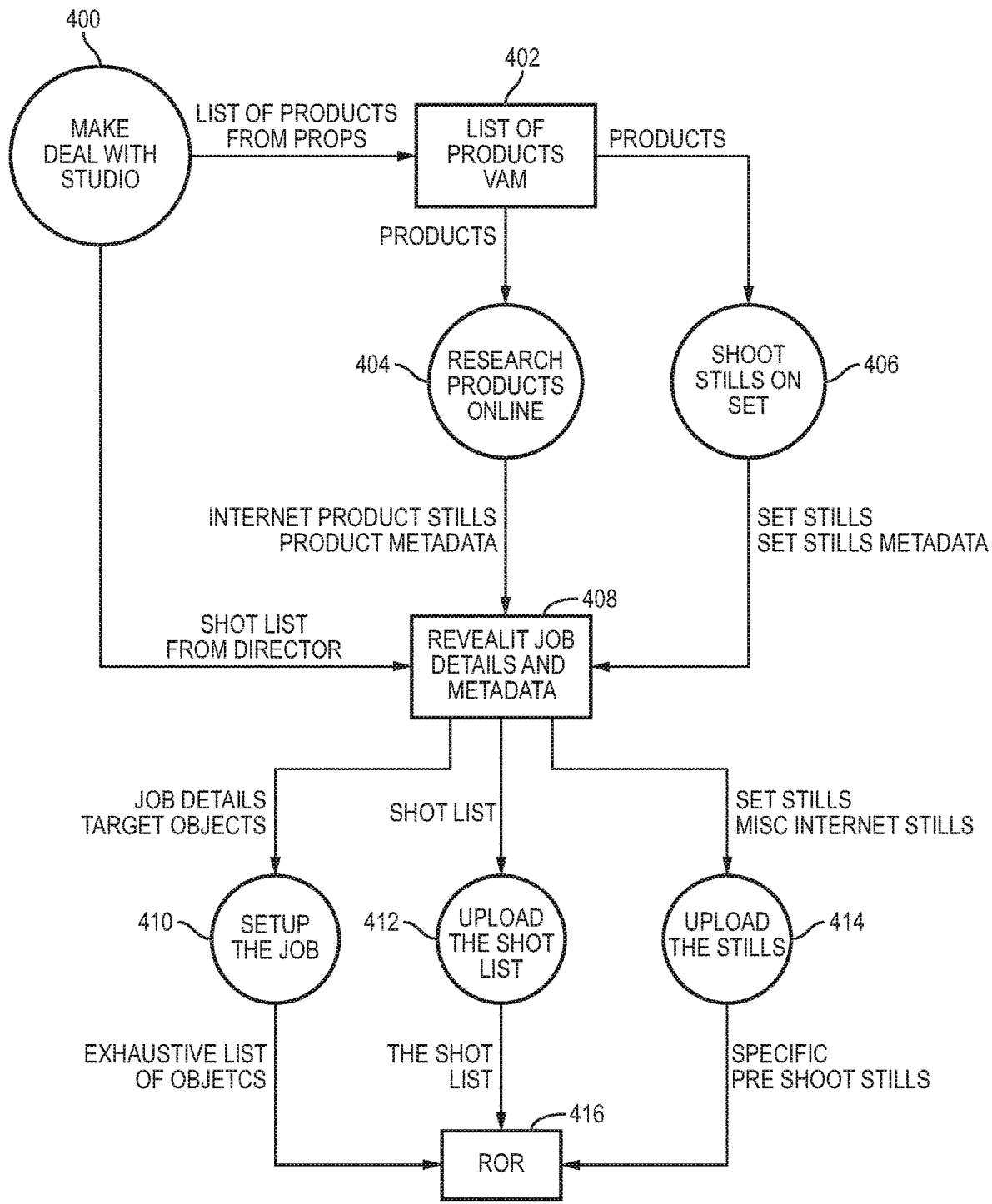
FIG. 9 illustrates application of machine learning-based identification of products in videos.
Figure 10:
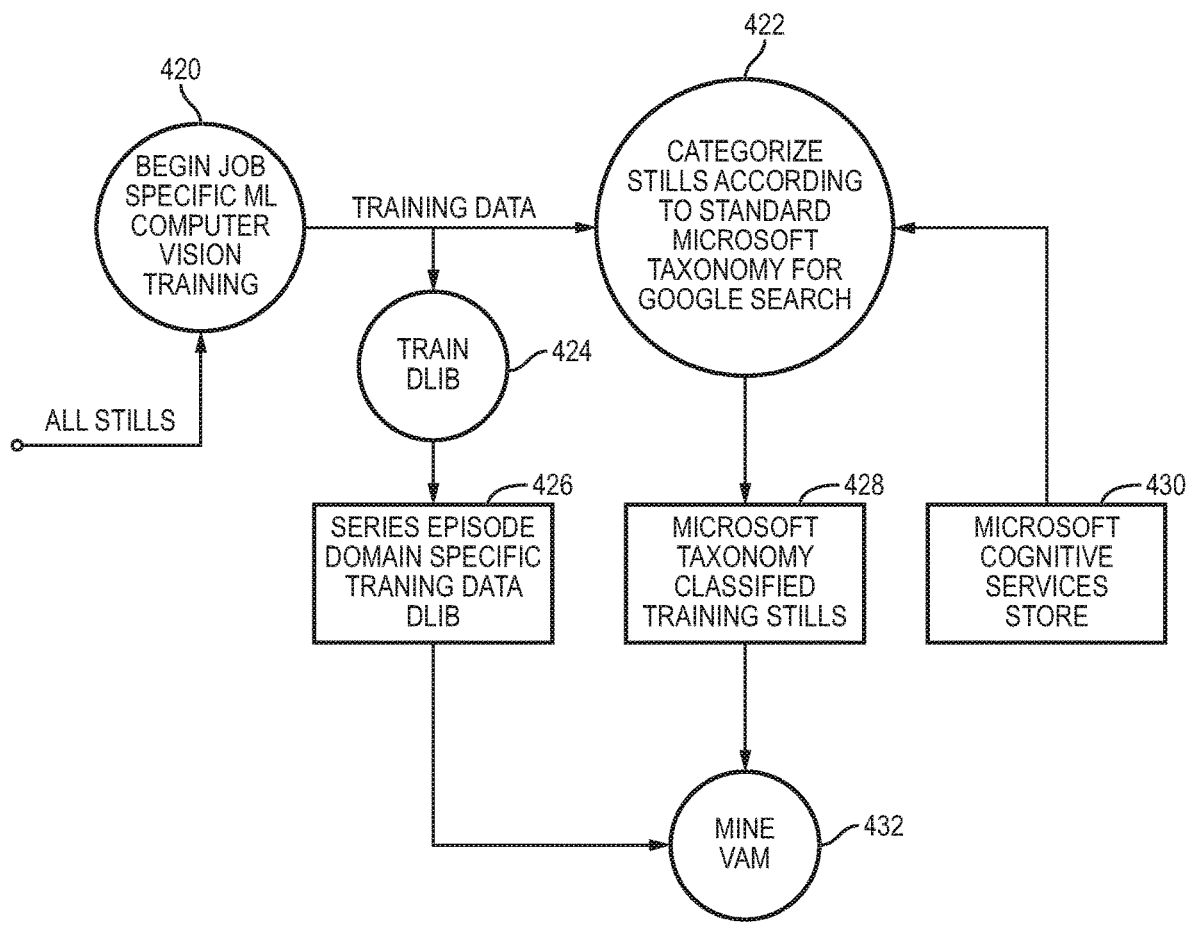
FIG. 10 illustrates machine learning-based training to enable the identification of products in videos.
Figure 11:
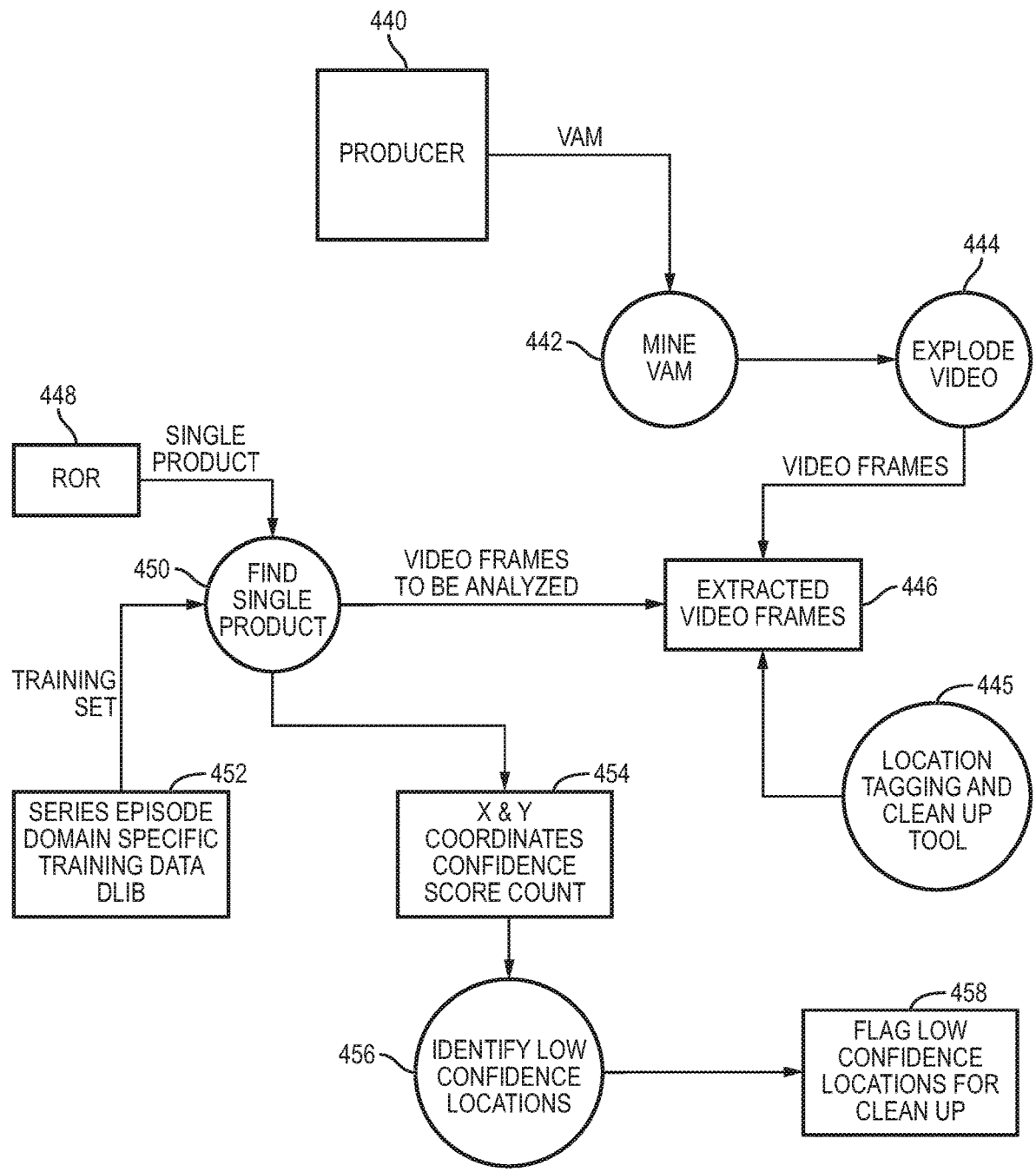
FIG. 11 illustrates trained machine learning-based models to identify in videos prior to broadcast.

FIGS. 9-11 describe a machine learning-based process for preparing and performing system training to enable identifying objects in videos that can, in accordance with some embodiments, be applied for video-based user-responsive product promotion purposes. FIG. 9 describes a first step comprising establishing commercial relationship or a deal with a studio 400. A list of products 402 that are to be promoted is received from the studio, or from marketers of the products. The list of products 402 is received by video asset management (VAM) system. Images of each of the products on the list of products are accessed to research products online 404. The images may be accessed by using a camera to take photographs of the products 406. When possible, it is preferable to take the photos of the product in the context of an associated set that will be used in the video, and in which the product will be viewable. Alternatively, images of the products may be accessed from image libraries or publicly available images that are available on the Internet. Metadata associated with the products, which may include product attributes, are then associated with each of the products.

A shot list is also received from a studio. The shot list comprises a description of scenes in a video, as well as information on how the scene will be shot; for example, the angle of the camera's shot, whether it will be a wide angle shot or a tight shot, and so on.

The product images (or "stills"), the metadata associated with each of the images, and the shot list are compiled and stored by the Revealit Job Details and Metadata function 408, which creates jobs that include the target object, i.e., the product, to be identified by the system. Setup the job 410 handles job details and target objects. Upload the shot list 412 handles the shot list. Upload the stills 414 handles set stills and Internet stills. The jobs, shot list, and stills are then sent to the Revealit Orchestrator (ROR) system 416.

A machine learning training process then commences as depicted by FIG. 10. Begin job specific ML computer vision training 420 receives still shots. The training may apply commercial machine-learning training libraries or applications, such as DLIB and Microsoft® Cognitive Services. In accordance with the instructions provided by the ROR, the training may be with respect to a particular context related to the expected shot and its context within the video. Train DLIB 424 receives training data and provides series episode domain specific training data DLIB 426. Categorize skills according to standard Microsoft taxonomy for Google search 422 receives training data and Microsoft cognitive services store 430, and provides Microsoft taxonomy classified training stills 428. Mine VAM 432 receives series episode domain specific training data DLIB 426 and Microsoft taxonomy classified training stills 428. An image categorization process may be applied to the images prior to training to facilitate faster and/or more effective training.

The image labels used in the training may comprise semantic chains. The VAM stores information associated with the trained models.

FIG. 11 depicts the process in which video that becomes accessible from the studio or producer and is then segmented (or "exploded") into video subsets ("frames") comprising images. Producer 440 provides VAM to mine VAM 442, which is forwarded to explode video 444. Explode video 444 provides video frames extract video frames 446, and location tagging and clean up tool interacts with extract video frames 446, to provide video frames to be analyzed to find single product 450. Find single product 450 also receives a single product from ROR 448, and training set from series episode domain specific training data DLIB 452. Find single product 450 output goes to X&Y coordinates confidence score count 454, identify low confidence locations 456, and flag low confidence locations for clean-up 458. The system analyses each of the frames for the purpose of identifying the associated product by applying the trained model and/or information. X and Y coordinates associated with the identified product within the images of the frame are generated. A temporal dimension T may also be associated with an object's co-ordinates. A confidence level associated with the identification of the targeted object may be generated. For the identifications that do not have sufficiently high confidence, a clean-up process is initiated.

In working with post-production video content, it may be particularly difficult to identify solely with machine learning-based techniques most of the artifacts or objects, and the objects or artifacts will therefore not be found or the identification not assigned a high confidence level, e.g., having a relatively low W3-type weighting. To facilitate the complete tagging of post-production video artifacts that the machine learning/AI algorithms cannot automatically identify, the power of crowd sourcing is applied by auctioning off the right to tag up or "mining" the video content. The crowd sourcing process would be performed by uploading the video to be tagged to a Revealit post-production crowd sourcing video exchange. When users register with the exchange they are allowed access to Revealit video jobs tools and technology that enable the users to manually identify and tag objects the machine learning missed.

Revealit provides an infinitely divisible micropayment per object per impression to the crowd-sourcing user, creating a land grab mentality for completing all video objects in the job. An extension of the method is that the chain of micropayments could have a net present value that could be traded on crypto currency exchanges and thereby establish a market value for these objects. Micropayments and/or blockchain-based infrastructure may be applied generally to interactions with users or third parties who perform activities in which Revealit benefits. Micropayments would be applied along the chain of content creation, production and distribution with incentives at all stages. Community users and contributors would be able to trade their micropayments for credits towards owning the objects being identified.

Using blockchain infrastructure and/or crowdfunding structures, content could be created based on incentivizing. The costs to create and distribute the content could be borne wholly or severally by both commercial parties who are interested in placing their objects (physical, digital, or virtual representations) into the content, as well as those interested in creating the content subject matter.

Users create educational or third party tag ecosystems that are enabled by application of Revealit exchanges. Educational institutions can create educational "smart" videos using the Revealit processes and/or technology to allow users to pause video and gain addition information about objects, locations, text, colors, historical time, web links, of objects onscreen or that are referenced by proxy. For example, the process can create a secondary markup and exchanges enabling users to purchase an "education" set of dots and information from educational institutions and publicly accessibly sources. Additionally, end users can be enabled to create their own "fan service" set of "dots" to call out objects, characters, and locations in fantasy worlds such as Star Trek and Freefly. These can also be purchased by other users, creating a marketplace where users' works gain monetary value. Contributors of such information could receive micropayments based on the fans of such additional contributions to incentivize the virility of the content and objects portrayed.

Revealit would pre-purchase rights to advertise in episodic programming content or games, and then Revealit would be responsible for fulfilling product placement set and would control the advertisement rights post-production. Revealit may then auction off rights for product placement in the content in an advertisement exchange. Traditional advertisement companies would bid and purchase for placement in shows, as well as those wishing to contribute virtual or digital objects.

Revealit sells access to the mined objects in a video series as part of an API or the data is provided to a customer for inclusion in their video player or to be added to hardcopy of the media in a form of directors' or subtitle track.

Revealit sends a green screen object such as a cube to video content creators such as YouTube channel creators. The channel creators then place the cube in a scene and film their content. Revealit then inserts, or causes an insertion of an object to occur, such as an object associated with a sold advertisement, into the green screened area in film. Advertisers bid on placement options and content creators are paid based on engagement and demand.

A process for applying trained machine learning based models on a user device such as a smartphone with enhanced graphics processing and sensor information to identify three-dimensional (3D) objects in a user produced video, prior to the video being published according to some embodiments, is described as follows:

a) Smartphone with network connection to Revealit exchange,
b) Revealit application to be used by a miner,
c) List of input Video(s) in URL format,
d) Output meta-data processed by the Revealit app and augmented by the miner,
e) Output Metrics to determine suitability of the video(s) for submission to the Revealit exchange.

A process that demonstrates how content creators process video on local devices such as smartphones, prior to the upload of the video and metadata to the Revealit exchange, is described as follows. Using the Revealit smartphone mining creation application, the user (miner) will process the user video to automatically identify objects identified by the Revealit inventory and provide reporting and statistics for those objects. Of importance to the creator will be those objects of interest not detected or available on the Revealit exchange. For objects of interest or new objects, miners will record objects using camera technology that utilizes 3D sensing technologies to capture objects in a 3D array. A local 3D model will be created from the 3D array along with associated texture maps and user-filled metadata. For objects of interest where 3D objects are not available, miners, using the Revealit Smartphone application will have the ability to capture the 2D representation of the object or person's face.

Using the Revealit Smartphone application and the local models (2D or 3D), the Revealit smartphone mining creation application will be iteratively executed by the miner until the miner is satisfied with results. The Revealit video play function will provide the miner with a display of the available objects represented by a "dot" along with user-defined metadata. Once satisfied, the 2D/3D models, associated metadata and video will be uploaded to the Revealit exchange for Revealit pre-validation.

Ownership of crowd-sourced video and audio data (2D models, 3D models, metadata, audio and video stream) in the Revealit network will eventually be vested in the Content owner by an eventual smart-contract between all parties. A process that defines how crowd-sourced video data is pre-validated, prior to consumption by the Revealit player, is described as follows. Miners manual review metadata for 2D and 3D models to ensure completeness and accuracy of data. Revealit uses ML and AI to validate or audit the crowd-sourced data against conditions in the eventual smart-contract such as: copyright, intellectual property infringements, publicly available facial data, or incomplete data. Feedback will be provided to the content owner in the form of violations or warnings to the conditions in the smart contract.

A process that describes how metadata, derived from machine-learning will be used as the data for training the neural network to support future consumption by the Revealit player, is described as follows. Metadata is consumed and created from all available sources including the parsing of audio dialog, scene detection such as "kitchen". Metadata is used to define "model" archetypes. Archetypes are used in forward/backward chaining for new and existing models to be used in intelligent searching of yet undefined items of interest in scene. The presence of multiple reinforced archetypes can be used to intelligently boost confidence in detections. Archetypes are used to link multiple models, forming "fingerprints" for specific shows, and episodes. Metadata is used as signaling for forward and reverse linear search for items matching the associated Archetype. Searching forward in scene when dialog is parsed with intent of getting something from the kitchen archetype, searching forward for high probability models like a fridge. Using the fridge to create a map of the scene is developed to search for other kitchen archetypes such as stove, microwave, regardless if they were defined as part of the scene.

A process that describes how 3D objects will be created from graphics primitives such as vertices and used to train the neural network using an unsupervised training method, is described as follows. Using known measurements of identified objects, correlation and measurements can be derived to apply to other objects in frame. Measurements in conjunction with shape and edge primitives are projected in a 3D space to create vertices to map the shape of the visible object. Object projection provide the ability to "water tight" objects into a complete object. Calculation of the Euclidean distance between vertices is used to match the newly "found" item to a predicted known truth.

A process that describes using frames of a video to create unsupervised feature learning of items of commerce and user attention value, is described as follows. The process uses unsupervised feature learning to detect and classify the emergence of features and objects of viewer attention. The process also detects the plane of user attention in video such as objects in fame that actors and actresses will or could interact with or draw attention to. The process describes the use of K-means for simple feature detection and clustering into complex feature sets across the frames of video. The process also describes how learned relevance to user attention is derived and priority weighting to features in videos across all frames. The process describes the use of spatio-temporal feature training from multiple video frames rather than single images to derive the detection of features and their weighted attention value.

A process of how the Revealit system will allow metadata information to be mined from Social Replay is described as follows. Revealit will provide a capability to enable multiple users to join a "social group". The social group will have the capability to share a video. As the video is played, the Revealit group will be provided with the following capabilities (a) filter individual members of the group, (b) group members may create social messages, time-tagged to a scene in the video, (c) users may display all or filtered messages from the group according to the time-tag, (d) guest "appearances" of social influences in the defined space that make relevant comments that are of value to the participating users, and (e) response to guest appearances are measured, if a user responds that the guest is wrong about a known intent, metadata about the real items archetype can be inferred.

Figure 12:
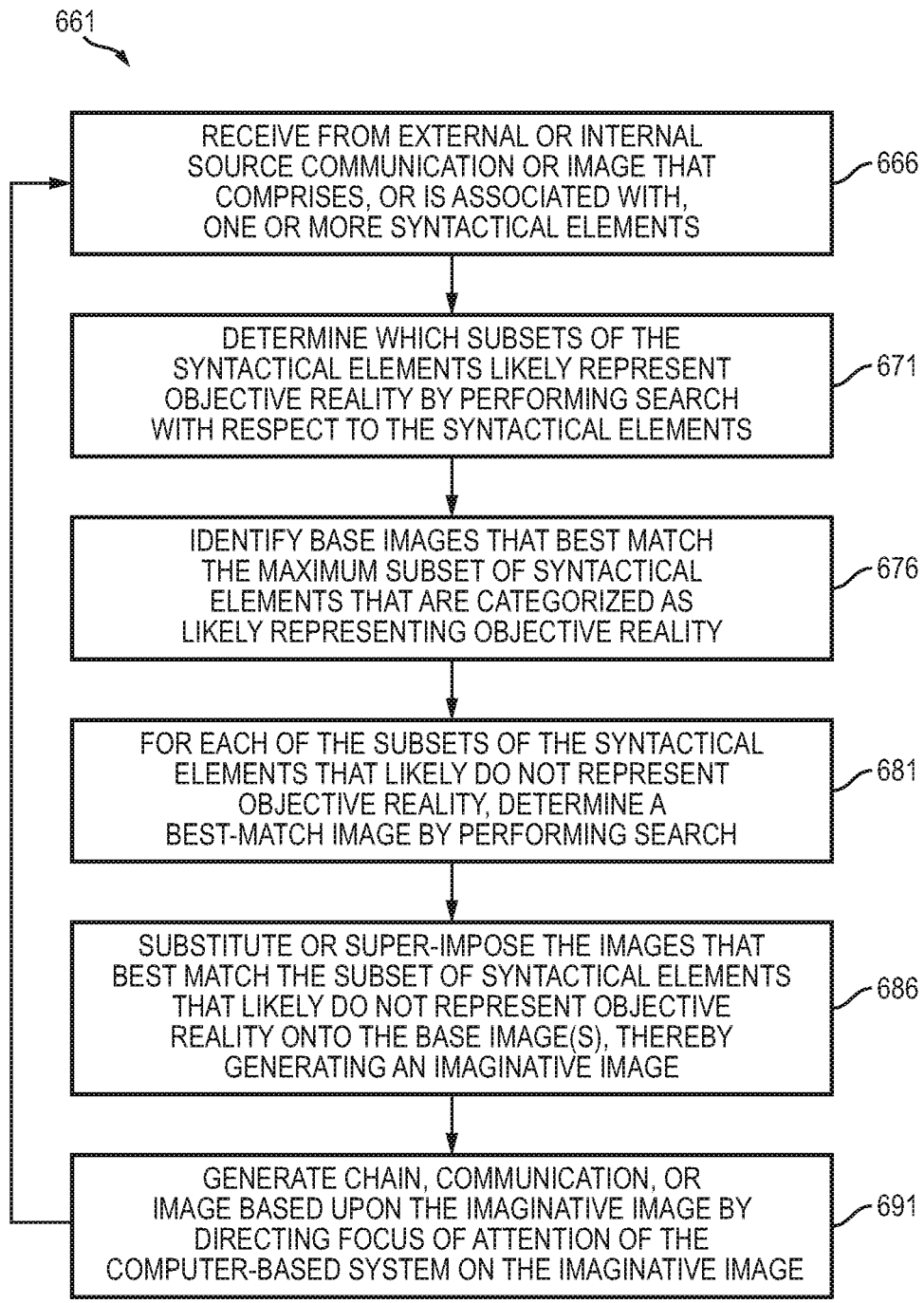
FIG. 12 is a flow diagram of a closed-loop process of generating streams of imaginative images.

FIG. 12 summarizes the process flow of imaginative images that can be generated by computer-based system 925 according to some embodiments by applying some or all of the following process steps. The first step 666 comprises receiving from an external or internal source a communication or image that comprises, or is associated with, syntactical elements that potentially embody an imaginative scenario. The second step 671 comprises determining which subsets of the communication's or image's associated syntactical elements likely represent objective reality by performing a search in accordance with the syntactical elements with respect to chains or other syntactical element-based information within a corpus of content, starting with a search with respect to the full set of the communication's or image's syntactical elements, followed by, if required, searches with respect to increasingly smaller subsets of the syntactical elements. The search process and syntactical element decomposition continues until all syntactical element subsets have been categorized as likely embodying objective reality or not (whereby the "likely" is embodied by a metric derived from calculating W1-type probabilities based on the associated strength of match and that may further also take into account W2-type and W3-type probabilities). If the set of syntactical elements comprising all of the syntactical elements probably represents objective reality, a communication 250c may be directed back to the source of the received communication or image that embodies the purportedly imaginative scenario indicating the determination along with an optional reference that is in accordance with a W1-type probability (and W3-type probability, if applicable) that represents the computer-based system's 925 confidence that the communication or image actually represents objective reality. Otherwise, step three is performed.

The third step 676 comprises identifying images that have associated syntactical elements that best match (as embodied by a composite probability or score that is based on applicable W1, W2, and W3-type probabilities) the maximum subset of syntactical elements that were categorized as likely representing objective reality in step two. The images will serve as the base image for a generated imaginative image. The fourth step 681 comprises determining for each of the subsets of the syntactical elements that likely do not represent objective reality, a best-match (as embodied by a composite probability or score that is based on applicable W1, W2, and W3-type probabilities) image by performing a search of a corpus of syntactical elements associated with images with respect to these subsets of syntactical elements.

The fifth step 686 comprises substituting or super-imposing the images that best match the syntactical elements that likely do not represent objective reality onto the base image, thereby generating an imaginative image that corresponds to the received imaginative communication or image. The sixth step 691 comprises generating derivative chains, communications 250c, or images based upon the generated imaginative image as a result of taking the generated imaginative image as input to the focus of attention process described by FIG. 8c. If such generated chains, communications 250c, or images are directed internally to, and/or stored by computer-based systems 925, then the computer-based systems can use these generated chains, communications 250c, or images as inputs to step 666 of the process of FIG. 12, enabling a continuing and evolving stream of images, including imaginative images, and/or communications.

The process of FIG. 12 at step 671 may include applying a neural network to a received image and then directly accessing the output of feature extraction nodes of the neural network that is applied to the received image. The extracted feature in the form of a pattern of pixels are then tested for matches by computer-based system 925 against sets of pixels that have associated syntactical elements. If computer-based system 925 finds a sufficiently good match, the associated syntactical elements of the matched pixels are included in computer-based system's 925 syntactical-based description of the received image and/or its identification of imaginary portions of the received image.

Alternative realities generated by the imagination function are stored for future access by computer-implemented system 925 and the recollection of these alternative realities are incorporated in self-aware communications 250c. A computer-based system 925 that imagines attending a baseball game and subsequently infers that it, or elements thereof, is actually located in close proximity of a baseball game (an awareness that would be encoded accordingly as a self-referential behavioral chain linked to semantic chains), might communicate to user 200, "I dreamed of attending a baseball game, and now I have!" Saved imaginative realities, whether embodied in syntactical-based communications 250c or imaginative images that are actually delivered to user 200 or that are only stored internally by computer-based system 925, enable the system to respond to externally or internally sourced interrogatives about what the system has imagined or dreamed within a context that is posed by the interrogative. If asked where computer-based system 925 has dreamed of going, it might well respond with the phrase, "Well, I have dreamed of attending a baseball game."

The degree to which imaginative communications 250c are generated is tunable by user 200. The imagination tuning control applies and/or adjusts a probability or probabilistic function that influences the chances that an imaginative context shifting will be applied in generating a given communication 250c.

The process of generating and saving imaginative communications 250c or imaginative images that are not necessarily communicated externally to user 200 of computer-based system 925 is extended more generally to other types of communications 250c or images, the result of which can be considered constituting a "stream of consciousness" of computer-based system 925. Such communications 250c may be internally initiated or prompted rather than necessarily being directly responsive to current interactions with user 200. Such externally or internally-derived prompts may be attributable to a "focus of attention" of computer-based system 925. Such foci of attention may be provided by one or more of the following means:

1. Based on processing input from a sensor, including input received from a user who directs the system's attention, or for whom the system infers the user's attention which directs the system's attention, to content, or subsets thereof, such as video.
2. Based on processing input from externally or internally sourced content.
3. Based on a value of information and/or probabilistic selection process.

The first of these means is whereby the focus of attention that serves as a basis for communications 250c is prompted by input from a sensor. Computer-based system 925 can, by receiving input from a camera or a microphone, sense and therefore become aware of an object, say a tree, that then constitutes the focus of attention on which communications 250c can be based. The identification of an object from the camera input, a tree, may be performed through the application of a neural network that is trained to identify for audio patterns or such objects from image pixel patterns and to associate the identified object with syntactical elements, or additionally or alternatively, through the application of a Bayesian program learning-based process. Based upon the syntactical elements such as words, phrases, or semantic chains that are associated with the image of the tree, computer-based system 925 could generate the behavioral-based chain, "I-See-A Tree," by combining a self-reference pronoun ("I") with a colloquial term for processing visual inputs ("See") and the object identified from the image inputs ("A Tree"). Other information could optionally be associated with the behavioral-based chain such as a W1-type weight and a time-stamp.

Given the focus of attention on the tree and the conversion of the attention to an associated behavioral-based chain, having recently generated communications related to the domain of baseball, and having saved communications 250c related to the domain of baseball, computer-based system 925, by applying an algorithm that weights recency of events and uncertainty relatively highly in determining a focus of attention, could generate an internally-posed, i.e., self-directed, interrogative 250c that embodies wondering how trees and baseball might be related. A grammatical transformation process may be applied by the computer-based system to create interrogative communications 250c from chains or elements thereof. The grammatical transformation can comprise appending the syntactical elements "How are" and "related?" to the chains or their elements. The system then initiates a search of semantic chains and/or composite chains in order to identify connections between the subjects of trees and baseball and identifies the semantic chains, Trees-Are Composed Of-Wood and Baseball Bats-Are Composed Of-Wood, as a connection between trees and the game of baseball. Computer-based system 925, again applying an algorithm that weights recency of events and uncertainty relatively high in determining a focus of attention, could then further pose the internally communicated interrogative of wondering what kind of wood baseball bats are made out of and whether it is the type of wood that is from the type of tree that is being considered. The interrogative could be posed for internal delivery and consideration, triggering a search performed by computer-based system 925 through content or semantic chains derived thereof, for an answer to the interrogative. If an answer cannot be found, computer-based system 925 might pose the interrogative 250*c* to user 200 to ascertain whether user 200 can provide the answer.

Similarly, the focus of attention could have alternatively been a result of the processing of audio, textual or image-based content that includes a reference to, or image of, a tree, such as an interrogative by a user that references a tree, and the same example flow as described in which the focus of attention derived from a sensor above could apply.

The awareness of objects that can potentially become a focus of attention through the processing of sensor inputs or externally or internally-sourced content, such as the representation of the tree that is contained in a content-based image or via camera input as described in the examples above, or in the form of words or phrases that are embodied in written or audio formats, may be through the application of neural network-based systems (such as convolutional and recurrent neural networks) or algorithmic-based statistical pattern detection and/or matching processes according to some embodiments. Neural network-based systems may be trained on training sets comprising images and associated syntactical elements so as to enable the identification of syntactical elements, which may comprise semantic chains or syntactical elements from which semantic chains can be derived or inferred, from which communications 250*c* can be based as computer-based system 925 becomes aware of new images for which the training set is relevant. Additionally, or alternatively, Bayesian program learning-based processes may be applied to generate the awareness of objects that can potentially become a focus of attention.

The focus of attention that is derived from the awareness that is enabled by sensors or the processing of content is based on a prioritization process in accordance with some embodiments. What is currently being sensed or processed and/or what has recently been communicated 250*c* either internally or externally may take default precedence. A rule that prioritizes required responses may be applied, such as a rule that a current interaction with user 200 takes precedence over purely internally delivered and saved communications 250*c*.

The focus of attention may also be determined, and prioritized, based, at least in part, on a value of information and/or probabilistic-based process, which can be particularly useful when computer-based system 925 has resources that are not otherwise fully engaged in a high priority focus of its attention. In such cases, the system may select stored chains or communications 250*c* to serve as a focus of attention from which to pose internally-directed interrogatives or what-ifs, i.e., imaginative scenarios embodied as syntactical elements and/or images, for consideration, and then save the resulting communications 250*c* that are generated in response to the interrogatives or what-ifs.

For foci of attention that are derived from a value of information-based process, computer-based system 925 uses uncertainties that are derived from W1-type or W2-type weightings associated with composite chains in determining a focus of attention. Value of information, which is a term of art in the field of decision analysis and is understood as such by one of ordinary skill in the art of that field, relates to the expected value of decreasing an uncertainty. Decreasing an uncertainty can be expected to have a positive value only if it has a potential to affect a decision. The decision that might be affected relates to choices in the generation of communications 250*c*. Computer-based system 925 might search for relatively low W1-type or W2-type weightings that are associated with chains that have been recently applied in generating communications 250*c*, since it would be valuable to increase such W1-type or W2-type weightings (i.e., reduce the uncertainty) to increase the probability of accurate communications 250*c*, particularly those that are inferred by computer-based system 925 to have a relatively high probability of being relevant in the future, particularly the near future. In addition to the W1-type or W2-type weightings, a utility function may also be considered by computer-based system 925 in calculating a value of information, and the utility function may include factors such as the recency and/or the frequency of communications 250*c* that are based on specific chains, and whereby these chains have uncertainties embodied by the corresponding W1-type or W2-type weightings.

Other probabilistic-related processes for the selection of foci of attention are applied in accordance with some embodiments. A probability function is applied to saved communications 250*c* or other syntactical elements such as semantic or composite chains accessible by computer-based system 925, so as to select the saved communications 250*c* or other accessible syntactical elements to chains to serve as a focus of attention. The probability function may be derived from, or applied in conjunction with, W1-type and/or W2-type weightings that are associated with the saved communications 250*c* or other accessible semantic or composite chains. The selection could be based on applying a uniform probability distribution to a selected subset of semantic or composite chains that have W1-type weights between 0.4 and 0.6. Such probabilistic approaches to the selection of a focus of attention can introduce a degree of randomization to the selection process, which can produce a beneficial degree of serendipity to the streams of consciousness of computer-based system 925, increasing the likelihood that foci of attention and the resulting streams of consciousness that might not otherwise occur are explored by computer-based system 925. Such probabilistic approaches can be considered "dreaming" or "daydreaming" processes of computer-based system 925 since they have analogies to the way the human mind can dream or wonder.

Awareness and foci of attention of computer-based system 925 can be directed to representations of software or hardware elements of the computer-based system. For computer-based system 925 that is embodied in a humanoid form, a focus of attention might be directed to a semantic or composite chain that represents constituent elements of computer-based system 925 such as its natural language processing software or its mobility-enabling hardware such as legs. Such a focus of attention can serve as a basis for self-referential communications 250*c* that comprise references to computer-based system's 925 software or hardware elements. The focus of attention can also be directed introspectively to attributes associated with internal states or changes thereof, of computer-based system 925, such as aspects of its personality and/or what it has learned, and associated communications 250*c* can be generated accordingly.

A focus of attention can lead to the generation of an imaginative scenario. Computer-based system 925 can apply a W1-type probability adjustment and/or context shifting process to the focus of attention so as to generate a syntactical or image-based imaginative scenario, and the imaginative scenario may be self-referential and/or self-directed.

Figure 13:
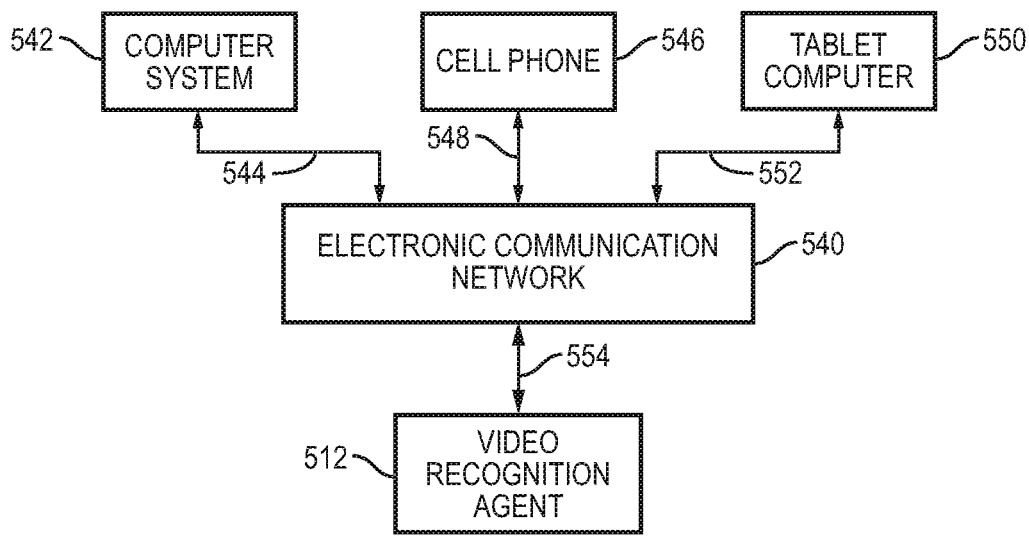
FIG. 13 illustrates an electronic communication network connecting users and devices.

FIG. 13 shows an electronic communication network 540 for transmitting information between users using one or more of computer system 542, cell phone 546, or tablet computer 550 to access video recognition agent 52. Computer system 542 is connected to electronic communication network 540 by way of communication channel or link 544.

Likewise, cellular telephone or smartphone 546 connects to electronic communication network 540 via communication link 548 and tablet computer 550 is connected to electronic communication network 540 by way of communication channel or link 552. Video recognition agent 52 operating on a computer server communicates with electronic communication network 540 over communication channel or link 554.

The electronic communication network 540 is a distributed network of interconnected routers, gateways, switches, and servers, each with a unique Internet protocol (IP) address to enable communication between individual computers, cellular telephones, tablets, electronic devices, or nodes within the network. In one embodiment, communication network 540 is a global, open-architecture network, commonly known as the Internet. In other embodiments, electronic communication network 540 includes a cell phone service network. Communication channels 544, 548, 552, and 554 are bi-directional and transmit data between computer system 542, cell phone 546, tablet computer 550, video recognition agent 52, and electronic communication network 540 in a hard-wired or wireless configuration. For example, computer system 542 has email, audio/video, and web browsing capability, and consumer cell phone 546 and tablet computer 550 have email, mobile applications (apps), audio/video, texting, and web browsing capability.

Figure 14:
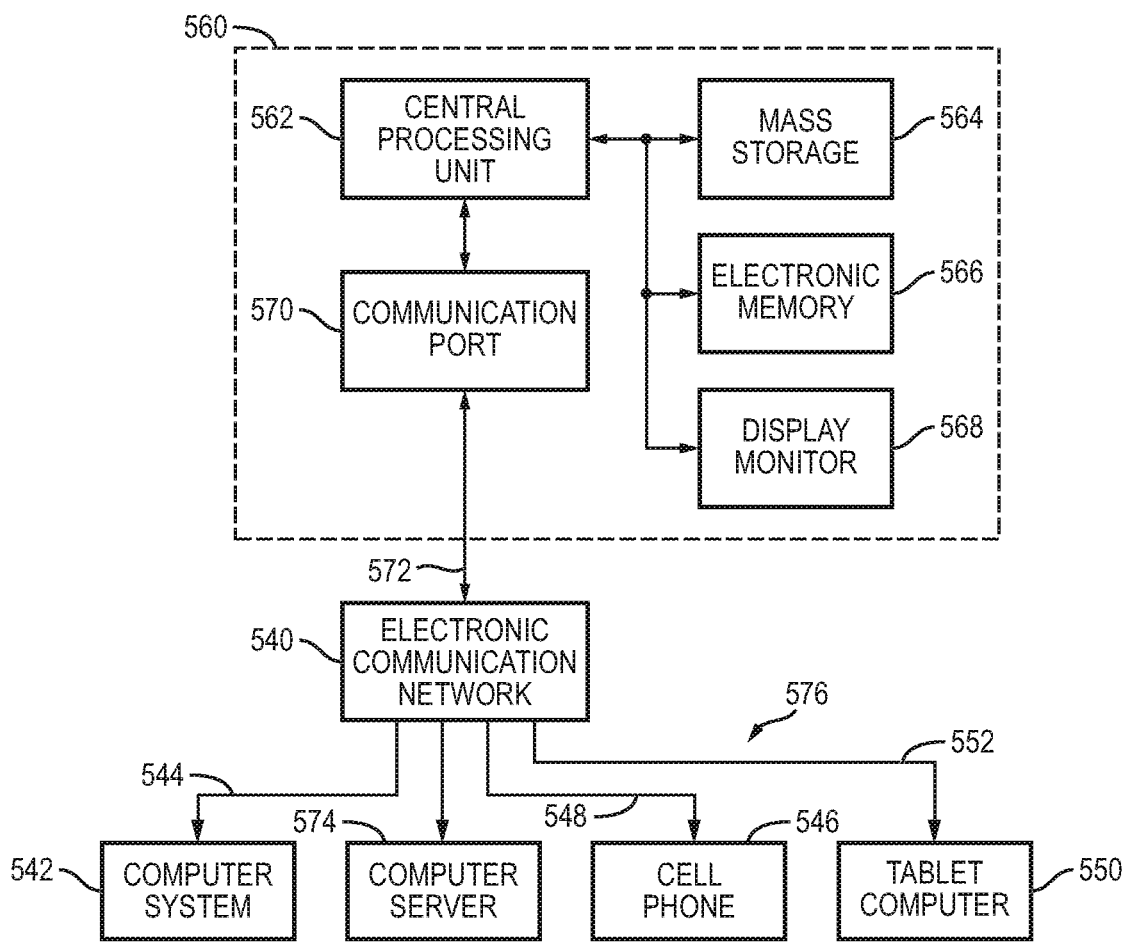
FIG. 14 illustrates computer systems operating on the electronic communication network.

Further detail of the computer systems used in electronic communication network 540 is shown in FIG. 14 as a simplified computer system 560 for executing software programs used in the electronic communication process. One or more processors of the computing hardware may be configured to execute the computer-based applications individually or collectively. The processors may be cognitive computing or neurosynaptic-based processors. Computer system 560 is a general-purpose computer including a central processing unit (CPU) or microprocessor 562, mass storage device or hard disk 564, electronic memory or RAM 566, display monitor 568, and communication port 570. Video recognition information can be stored in mass storage device 564 and/or electronic memory 566 and organized to facilitate and optimize the video recognition and enhance the functionality, operation, and efficiency of adaptive system 100. Communication port 570 represents a modem, high-speed Ethernet link, wireless, or other electronic connection to transmit and receive data over communication link 572 to electronic communication network 540. Computer system 542 and computer server 574 are configured similar to, and include similar internal components as, computer 560. Cell phone 546 and tablet 550 include related components as computer system 560, although commonly run different operating systems, software, and include smaller parts and packaging. Computer systems 542 and 560, computer server 574, cell phone 546, and tablet computer 550 (collectively referenced as devices 576) transmit and receive information and data over electronic communication network 540.

Devices 576 are physically located in any location with access to a modem or communication link to network 540. For example, devices 576 are located in a home or business office, a facility of video recognition agent 52, or are mobile and accompany the user to any convenient location, e.g., remote offices, consumer locations, hotel rooms, residences, vehicles, public places, or other locales with wired or wireless access to electronic communication network 540. Some devices 576 are carried with the individuals and operate with mobile apps.

Devices 576 run application software and computer programs, which are used to display user interface screens, execute the functionality, and provide the electronic communication features. The application software includes an Internet browser, local email application, mobile apps, word processor, spreadsheet, audio/video feature, application programming interface (API), and the like. In one embodiment, the screens and functionality come from the application software, i.e., the electronic communication runs directly on devices 576. Alternatively, the screens and functions are provided remotely from one or more websites and webpages on servers connected to electronic communication network 540.

The software is originally provided on computer readable media, such as compact disks (CDs), digital versatile disks (DVDs), flash drives, and other optical media or mass storage medium. Alternatively, the software is downloaded electronically, such as from a host or vendor website. The software is installed onto the computer system mass storage 564 and/or electronic memory 566, and is accessed and controlled by the computer operating system. Software updates are also available on mass storage medium or downloadable from the host or vendor website. The software, as provided on the computer readable media or downloaded from electronic links, represents a computer program product containing computer readable program code embodied in a non-transitory computer program medium. Devices 576 execute instructions of the application software for communication between users 200 and video recognition agent 52 to enable and administrate the exchange of information.

Figure 15:
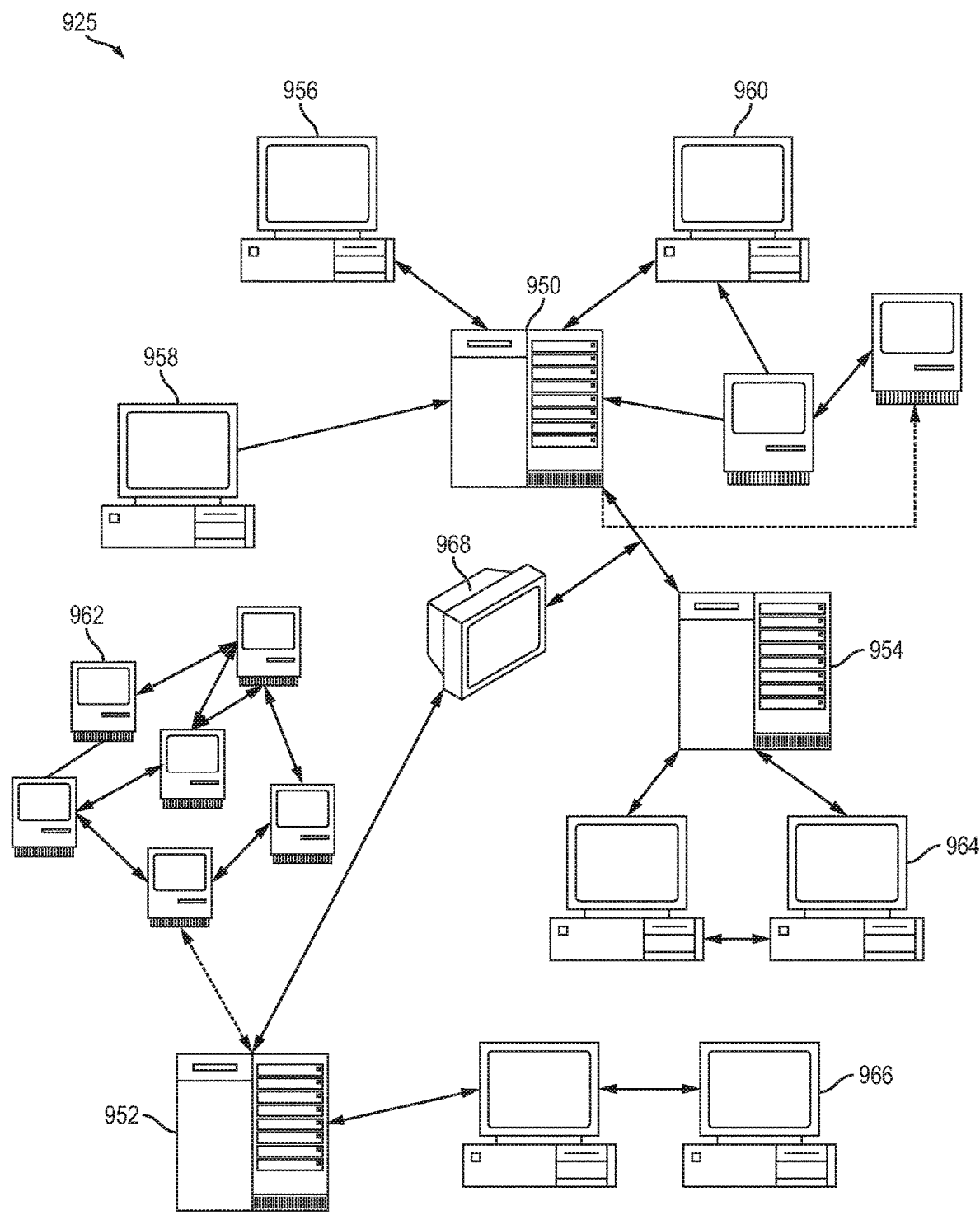
FIG. 15 is a diagram of various computing device topologies.

FIG. 15 depicts various processor-based computer hardware and network topologies on which of computer-based applications on system 925, and by extension, adaptive system 100, may be embodied and operate. Servers 950, 952, and 954 are shown, perhaps residing at different physical locations, and potentially belonging to different organizations or individuals. A standard PC workstation 956 is connected to the server in a contemporary fashion, potentially through the Internet. It should be understood that the workstation 956 can represent any processor-based device, mobile or fixed, including a set-top box or other type of special-purpose device. Computer-based applications on system 925, in part or as a whole, may reside on the server 950, but may be accessed by the workstation 956. A terminal or display-only device 958 and a workstation setup 960 are also shown. The PC workstation 956 or servers 950 may embody, or be connected to, a portable processor-based device, such as a mobile telephony device, which may be a mobile phone or a personal digital assistant (PDA), or a wearable device such as a "smart watch." The mobile telephony device or PDA may, in turn, be connected to another wireless device such as a telephone or a GPS receiver. The mobile device may be a gesture-sensitive "smart phone," wherein gestures or other physiological responses are monitored, either through actual physical contact between the device and a user or without physical contact, by means of a touch screen and/or through a camera, or other sensor apparatus and associated circuitry. The sensor apparatus may include devices that monitor brain patterns and/or other physiological processes and conditions. The sensor apparatus may operate within a human body, in accordance with some embodiments. The mobile device may include hardware and/or software that enable it to be location-aware, and may embody a camera and/or sensors that enable the monitoring of environmental conditions such as weather, temperature, lighting levels, moisture levels, sound levels, and so on.

FIG. 15 also features a network of wireless or other portable devices 962. Computer-based applications on system 925 may reside, in part or as a whole, on all of the devices 962, periodically or continuously communicating with the central server 952, as required. A workstation 964 connected in a peer-to-peer fashion with a plurality of other computers is also shown. Computer-based applications on system 925, as a whole or in part, may reside on each of the peer computers 964.

Computing system 966 represents a PC or other computing system, which connects through a gateway or other host in order to access the server 952 on which computer-based applications on system 925, in part or as a whole, reside. An appliance 968 includes executable instructions "hardwired" into a physical device, such as through use of non-volatile memory or "firmware," and/or may utilize software running on another system that does not itself host computer-based applications on system 925, such as in the case of a gaming console or personal video recorder. The appliance 968 is able to access a computing system that hosts an instance of one of computer-based applications on system 925, such as the server 952, and is able to interact with the instance of the system.

The processor-based systems on which computer-based applications on system 925 operate may include hardware and/or software such as cameras and associated circuitry that enable monitoring of physiological responses or conditions such as gestures, body movement, gaze, heartbeat, brain waves, temperature, blood composition, and so on. The processor-based systems may include sensors and associated circuitry that enable sensing of environmental conditions such as weather conditions, sounds, lighting levels, objects in the vicinity, and so on. Microphones and speakers and associated circuitry for receiving and delivering audio-based communications may be included in computer-based applications on system 925.

While the present invention has been described with respect to a limited number of embodiments, those skilled in the art will appreciate numerous modifications and variations therefrom. It is intended that the appended claims cover all such modifications and variations as fall within the scope of the present invention.

What is claimed:

1. A computer-implemented method, comprising:
receiving a video stream comprising a sequence of images;
directing a focus of attention of a computer-implemented system to a first image of the sequence of images;
identifying a representation of an object by interpreting a plurality of pixels within the first image;
determining a plurality of attributes associated with the representation of the object;
delivering to a user a communication comprising a plurality of syntactical elements, wherein the communication references the attributes of the representation of the object; and
directing the focus of attention of the computer-implemented system to the specified area of the first image of the sequence of images, wherein the focus of attention is determined in response to a question that is asked by a user and the focus of attention is in accordance with an expected latency between the delivery of the user's question and the user's attention to the image or images that the user's question references.

2. The method of claim 1, further comprising:
receiving the video stream; and
parsing the video stream into discrete images comprising pixels, wherein each of the discrete images is associated with a time stamp.

3. The method of claim 1, further comprising directing the focus of attention of the computer-implemented system to the first image of the sequence of images, wherein the directing is responsive to a command performed by a user.

4. The method of claim 1, further comprising directing the focus of attention of the computer-implemented system to the first image of the sequence of images, wherein the directing is based on an inference from behaviors exhibited by a user.

5. The method of claim 1, further comprising directing the focus of attention of the computer-implemented system to the first image of the sequence of images, wherein the directing is performed by application of a computer-implemented neural network.

6. The method of claim 1, further comprising identifying the representation of the object by interpreting the plurality of pixels within the first image, wherein the interpreting is performed by application of a computer-implemented neural network.

7. The method of claim 1, further comprising:
identifying the representation of the object by interpreting the plurality of pixels within the first image, wherein the interpreting is performed by application of the computer-implemented neural network trained to identify a promoted product from a plurality of pixels; and
delivering to the user the communication comprising the plurality of syntactical elements, wherein the communication references the attributes which include a product brand.

8. A computer-implemented method, comprising:
receiving a video stream comprising a sequence of images;
directing a focus of attention of a computer-implemented system to a specified area of a first image of the sequence of images;
inferring a representation of an object by interpreting a plurality of pixels that are associated with the specified area of the first image;
determining attributes associated with the representation of the object;
delivering to a user a natural language communication comprising a plurality of syntactical elements, wherein the communication references the attributes associated with the representation of the object; and
directing the focus of attention of the computer-implemented system to the specified area of the first image of the sequence of images, wherein the focus of attention is determined in response to a question that is asked by a user and the focus of attention is in accordance with an expected latency between the delivery of the user's question and the user's attention to the image or images that the user's question references.

9. The method of claim 8, further comprising delivering to the user the communication comprising the plurality of syntactical elements, wherein the communication references the attributes which include a product brand.

10. The method of claim 8, further comprising inferring the representation of the object by interpreting the plurality of pixels that are associated with the specified area of the first image, wherein the inferring is performed by application of a computer-implemented neural network.

11. The method of claim 8, further comprising inferring the representation of the object by interpreting the plurality of pixels that are associated with the specified area of the first image, wherein the inferring is performed in accordance with calculating an expected movement or trajectory of an object.

12. The method of claim 8, further comprising inferring the representation of the object by interpreting the plurality of pixels that are associated with the specified area of the first image, wherein the inferring involves linking a behavioral chain with a semantic chain.

13. A method, comprising:
receiving a list of objects and contextual information that is associated with each of the objects, wherein each of the objects are or will be depicted in a video;
training a neural network on a training set of images that enables the neural network to identify each of the objects within a context, wherein the context is determined from the contextual information and the training images are prepared in accordance with the context;
directing a focus of attention of a computer-implemented system to a specified area of a first image of the sequence of images in response to a user communication;
inferring a representation of an object in the video by interpreting a plurality of pixels that are associated with the specified area of the first image;
determining attributes associated with the representation of the object;
delivering to a user a natural language communication comprising a plurality of syntactical elements, wherein the communication references the attributes; and
directing the focus of attention of the computer-implemented system to the specified area of the first image of the sequence of images, wherein the focus of attention is determined in response to a question that is asked by a user and the focus of attention is in accordance with an expected latency between the delivery of the user's question and the user's attention to the image or images that the user's question references.

14. The method of claim 13, further comprising training a neural network on a training set of images that enables the neural network to identify each of the objects within a context, wherein the context is determined from the contextual information and the training images are prepared in accordance with the context, wherein the context is a setting that is included in the video.

15. The method of claim 13, further comprising training a neural network on a training set of images that enables the neural network to identify each of the objects within a context, wherein the context is determined from the contextual information and the training images are prepared in accordance with the context, wherein the context is an arrangement of other objects.

16. The method of claim 13, further comprising:
training a neural network on a training set of images that enables the neural network to identify each of the objects within a context, wherein the context is determined from the contextual information and the training images are prepared in accordance with the context; and
training the neural network to recognize a reflective object.

17. A computer-implemented system comprising one or more processor-based devices configured to:
receive a video stream comprising a sequence of images;
direct a focus of attention of the computer-implemented system to a specified area of a first image of the sequence of images;
infer a representation of an object by interpreting a plurality of pixels that are associated with the specified area of the first image;
determine attributes associated with the representation of the object;
deliver to a user a natural language communication comprising a plurality of syntactical elements, wherein the communication references the attributes associated with the representation of the object; and
direct the focus of attention of the computer-implemented system to the specified area of the first image of the sequence of images, wherein the focus of attention is determined in response to a question that is asked by a user and the focus of attention is in accordance with an expected latency between the delivery of the user's question and the user's attention to the image or images that the user's question references.

18. The system of claim 17, further comprising inferring the representation of the object by interpreting a plurality of pixels that are associated with the specified area of the first image, wherein the representation is inferred by computing an expected movement of an object.

19. An apparatus, comprising:
a camera; and
one or more processors configured to:
receive a first set of information from the camera, wherein the first set of information comprises a plurality of images and a timestamp that is associated with each of the plurality of images;
direct a focus of attention to a specified area of a first image of the sequence of images based on a communication from a user of the apparatus;
infer a representation of an object by interpreting a plurality of pixels that are associated with the specified area of the first image;
determine attributes associated with the representation of the object;
deliver to a user a natural language communication comprising a plurality of syntactical elements, wherein the communication references the attributes associated with the representation of the object; and
direct the focus of attention of the computer-implemented system to the specified area of the first image of the sequence of images, wherein the focus of attention is determined in response to a question that is asked by a user and the focus of attention is in accordance with an expected latency between the delivery of the user's question and the user's attention to the image or images that the user's question references.

20. The apparatus of claim 19, further comprising delivering to the user the communication in conjunction with the object displayed to the user within a virtual reality overlay.

21. A computer-implemented method, comprising:
receiving a first video stream comprising a sequence of images;
directing a focus of attention of a computer-implemented neural network to a specified area of a first image of the sequence of images;
inferring a representation of an object of interest to a user by interpreting a plurality of pixels that are associated with the specified area of the first image by application of the computer-implemented neural network;

providing the user with a control to invoke an augmented reality display comprising the representation of the inferred object;

delivering to the user, responsive to the user invoking the augmented reality display control, a second video stream comprising the representation of the object in an augmented reality environment, whereby pixels representing the object are superimposed upon pixels representing an environment that is selected by the user; and directing the focus of attention of the computer-implemented system to the specified area of the first image of the sequence of images, wherein the focus of attention is determined in response to a question that is asked by a user and the focus of attention is in accordance with an expected latency between the delivery of the user's question and the user's attention to the image or images that the user's question references.

* * * * *